United States Patent [19]
Lu

[11] Patent Number: 5,852,672
[45] Date of Patent: Dec. 22, 1998

[54] IMAGE SYSTEM FOR THREE DIMENSIONAL, 360 DEGREE, TIME SEQUENCE SURFACE MAPPING OF MOVING OBJECTS

[75] Inventor: Shin-Yee Lu, Pleasanton, Calif.

[73] Assignee: The Regents of the University of California, Oakland, Calif.

[21] Appl. No.: 871,557

[22] Filed: Jun. 9, 1997

Related U.S. Application Data

[63] Continuation-in-part of Ser. No. 500,380, Jul. 10, 1995.

[51] Int. Cl.$^6$ ............................. G01B 11/24; G06T 17/00
[52] U.S. Cl. ........................... 382/154; 382/254; 356/376
[58] Field of Search ................................... 382/103, 107, 382/106, 108, 152, 153, 154, 285, 291, 294; 434/4, 257; 345/427, 419, 358, 953; 348/47, 48, 94, 139, 136; 352/60; 901/47; 250/559.23, 559.31; 395/94; 356/12, 3.11, 376

[56] References Cited

U.S. PATENT DOCUMENTS

| | | | |
|---|---|---|---|
| 4,175,862 | 11/1979 | DiMatteo et al. | 356/375 |
| 4,500,916 | 2/1985 | Nabulsi | 358/51 |
| 4,858,157 | 8/1989 | Murai et al. | 364/560 |
| 4,937,445 | 6/1990 | Leong et al. | 250/237 |
| 4,982,438 | 1/1991 | Usami et al. | 382/25 |
| 5,175,601 | 12/1992 | Fitts | 356/376 |
| 5,561,526 | 10/1996 | Huber | 356/376 |
| 5,589,942 | 12/1996 | Gordon | 356/376 |

OTHER PUBLICATIONS

Steven J. Gordon and Faycal Benayad–Cherif, "4DI—A Real–Time Three–Dimensional Imager," SPIE vol. 2348, pp. 221–226.

"Visualizing Body Motion," Science & Technology Review Dec. 1996, Lawrence Livermore National Laboratory, Livermore, California, pp. 18–20.

Advertising for the C3D Clinical and C3D Builder by The Turing Institute, 1995, 77–81 Dumbarton Road, Glasgow G11 6PP, Scotland.

Fact Sheet, SurfaceGen® by CamSys.

"Gee Whiz," Digital Magic, Mar. 1997, p. 9.

*Primary Examiner*—David K. Moore
*Assistant Examiner*—Brian P. Werner
*Attorney, Agent, or Firm*—Richard B. Main

[57] ABSTRACT

A three-dimensional motion camera system comprises a light projector placed between two synchronous video cameras all focused on an object-of-interest. The light projector shines a sharp pattern of vertical lines (Ronchi ruling) on the object-of-interest that appear to be bent differently to each camera by virtue of the surface shape of the object-of-interest and the relative geometry of the cameras, light projector and object-of-interest Each video frame is captured in a computer memory and analyzed. Since the relative geometry is known and the system pre-calibrated, the unknown three-dimensional shape of the object-of-interest can be solved for by matching the intersections of the projected light lines with orthogonal epipolar lines corresponding to horizontal rows in the video camera frames. A surface reconstruction is made and displayed on a monitor screen. For 360° all around coverage of theobject-of-interest, two additional sets of light projectors and corresponding cameras are distributed about 120° apart from one another.

3 Claims, 16 Drawing Sheets

# IMAGE SYSTEM FOR THREE DIMENSIONAL, 360 DEGREE, TIME SEQUENCE SURFACE MAPPING OF MOVING OBJECTS

RELATED APPLICATION

This Application is a continuation-in-part of an earlier filed U.S. patent application, Ser. No. 08/500,380, filed Jul. 10, 1995 by the present inventor, and herewith now being abandoned.

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to three-dimensional imaging and more particularly to real-time reconstruction of the surfaces of moving objects.

2. Description of Related Art

Human motion has been captured for computer manipulation and simulation by a variety of methods. In one system, markers are placed at key points on the body, e.g., wrists, elbows, shoulders, hips, knees, feet, and head. The ability to track these points is improved by using infrared markers, and each individual marker is relatively easy to track during motion through time. Stick figure reconstruction is the general outcome of using such markers. The three-dimensional surface of the original target is lost. Such techniques have been used in medicine, sports, and entertainment. For example, the San Diego Children's Hospital uses such a system for gait analysis. In sports these systems are used to analyze golfers' techniques. Marker systems can cost $20,000 to $200,000.

Scanning laser systems have been used in medicine for plastic surgery and in entertainment for movie animation and costume fitting. As much as ten to seventeen seconds can be required for a simple scan, and the use of lasers makes such systems dangerous to those it targets, especially their unprotected eyes. Laser systems can cost from $50,000 to $400,000 and more.

A structured light approach has been used to capture three-dimensional surfaces of static objects. In this method, a single line strip of light, e.g., collimated laser light source, is projected on an object. A imaging sensor, such as a camera is used to capture the 2-D image of the line strip and convert it to three-dimensional spatial locations based on the calibration of relative position between the sensor and the light projector. The light project is typically mounted on a translation stage that allow the line strip sweep through the area to be imaged. "Three-Dimensional Measurement Device and System," E. D. Huber, U.S. Pat. No. 5,561,526, issued Oct. 1, 1996.

A real-time three-dimensional imager is described by Steven J. Gordon and Faycal Benayad-Cherif (Cambridge, Mass. 02142) that comprises a sensing technique for making continuous geometric measurements of the surfaces of three-dimensional objects. (SPIE Vol. 2348, pp. 221–225.) this a sensor claims several advantages over other three-dimension sensing technologies, including the ability to quickly strobe the light source, thereby freezing any relative motion with high-precision measurement capability. The system is also claimed to function well, even in ambient lighting. It can measure across surface discontinuities and is capable of measuring moving objects. A fan of laser planes is used to illuminate the scene and multiple solid-state video cameras to measure the stripes in the scene. A ranging sensor is needed that overcomes the limited accuracy and speed problems of conventional systems, e.g., through the use of a structured light pattern, multiple cameras and an image processor. the relative position of the light source and each of the cameras is calibrated as a basis for three-dimensional reconstruction. Gordon, et al., use a strobe with a 0.1 milliseconds dwell, as required for the CCD camera integration. Such synchronizes well with a 30 Hz video rate. Therefore, the data acquisition is at video frame rate with the ability of freeze motion at 0.1 millisecond intervals. The surface reconstruction was done on a common 50 MHz Intel PENTIUM™ system. The methods for disambiguating and triangulating the stripes into three-dimensional coordinates are described, and an example of a reconstructed scene is presented. The reconstruction of each surface point of the scene takes about three seconds. An example of a static, non-motion, scene of a hand holding a handset is published in the article. But because the system uses a relatively high power laser source to project its multiple light lines, the system is unsuitable for human body imaging and medical application.

A number of different technologies have been explored for ranging sensors including binary stereo, photometric stereo, texture gradients, range from focus, range from motion, time of flight, Moiré interferometric and structured light systems.

The most common systems in use in industrial applications are time of flight, Moiré interferometric, and structured light systems. Time of flight systems use a scanning modulated laser spot to measure a scene. A single element sensor measures the phase shift, or frequency shift, between the modulated outgoing and reflected beams which is proportional to the range of the object point. The range measurement accuracy of these systems depends somewhat on the reflective properties of the surface and the cost of the detection and processing electronics. Thus, these systems are typically useful for relatively low precision, low cycle-time tasks such as automobile body panel inspection or bin picking of large parts but are not appropriate for high-speed, high-precision tasks such as assembly, in-house part inspection, or tasks involving moving parts.

In Moiré interferometry, the scene is illuminated by a light source projected through a sinusoidal grid. An image is taken from a different perspective from the illumination using a camera with a second sinusoidal filter in front of the lens. The two patterns produce an interference pattern encoding the surface range. The technique produces measurements of local range changes, thus range measurements of scenes may be constructed for smooth surfaces by integrating the local range measurements across the scene. Absolute range measurements and range measurements across discontinuities are possible only by taking several measurements at different grating densities or from different projection directions. The precision of these systems is high but depends too much on surface reflective properties and coloring variations.

Motion surface capturing is different from capturing static three-dimensional surfaces. Most three-dimensional surface mapping techniques requires using multiple projected sequentially for a single surface reconstruction. Such techniques can not be used for motion capturing.

SUMMARY OF THE INVENTION

An object of the present invention is to provide a practical method and system for time series three-dimensional mapping of the surfaces of moving objects, especially humans.

A further object of the present invention is to provide a method and system for three-dimensional mapping of the surfaces of moving objects that is safe, especially any humans used as subjects.

Another object of the present invention is to provide a method and system for three-dimensional mapping of the surfaces of moving objects that requires no special outfitting of its targets, e.g., the strapping of markers on human subjects.

A further object of the present invention is to provide a method and system for three-dimensional mapping of the surfaces of moving objects that can capture data continuously at real-time video rates.

A still further object of the present invention is to provide a method and system for complete three-dimensional reconstruction of the surfaces of its subjects.

A further object of the present invention is to provide a method that covers a full 360° view angle Briefly, a three-dimensional motion camera of the present invention comprises a light projector placed between two synchronous video cameras all brought to bear on an object-of-interest. The light projector shines a sharp pattern of vertical lines (Ronchi ruling) on the object-of-interest that appear to be bent differently to each camera by virtue of the surface shape of the object-of-interest and the relative geometry of the cameras, light projector, and object-of-interest. Each video frame is captured in a computer memory and analyzed. Since the relative geometry is known and the system pre-calibrated, the unknown three-dimensional shape of the object-of-interest can be solved by matching the intersections of the projected light lines with orthogonal epipolar lines corresponding to horizontal rows in the video camera frames. A surface reconstruction is made and displayed on a monitor screen. For 360° all around coverage of the object-of-interest, two additional sets of light projectors and corresponding cameras are distributed about 120° apart from one another.

A three-dimensional motion camera system of the present invention comprises three imaging heads and a computer system. The three imaging heads surround the imaging area every 120°. A mutual coordinate system is established through a calibration procedure that transforms from the coordinate system of individual imaging head to a world coordinate system. Each imaging head comprises a light projector placed between two video cameras that are separated by an adjustable base line. The line strips are created by a projector lamp, focus optics and a Ronchi ruling that is oriented perpendicular to the camera base line. A near regular grid of vertical projected line strips and horizontal invisible "epipolar lines" are projected. The direction of the epipolar lines can be mathematically defined, and is, in general, parallel to the camera baseline. Epipolar lines are generated using computer codes based on camera parameters obtained from the calibration of individual cameras. All six cameras are synchronized and are connected to computer frame grabbing boards that capture simultaneous images. Each of the sets of stereo pair of images is processed by the computer to generate three dimensional coordinates of the object surface at the grid points. The processing software mainly establishes a correspondence of grid points "seen" from two perspectives (cameras). A surface can then be reconstructed from individual imaging head that are "pasted" together based using the virtual-world coordinate system.

The individual cameras are calibrated with respect to a fixed relative position and focus. Changing the camera base line or refocus/zooming requires a recalibration. Such changes of base line and focus allows imaging area flexibility for the same imaging apparatus. In the present approach, a calibration of the image sensor and light source is not required. The computer generation of the three-dimensional surface of the object-of-interest depends only on the camera relationships. Such approach allows the use of ambient light source, instead of collimated light source, such as a laser. Ambient light sources produce a shallower depth of focus compared to the camera depth of focus. For a particular camera calibration, the light projector can be adjusted for zoning and focus without needing a new calibration. In addition, the use of ambient light projector focus line strips only on the object of interest, where background objects may receive lights without focused line strips, An image processing software based on band-pass filtering can be employed to remove the background objects.

An advantage of the present invention is that a non-hazardous method is provided for three-dimensional imaging that is safe for eyes and therefore allows for the study of human motion.

Another advantage of the present invention is that embodiments make use of parallel sheets of light and mathematically derived optical planes to compute a dense grid that subdivides image pixels for high resolution surface maps and fast computation.

Another advantage of the present invention is that it does not rely on the calibration between light source and imaging sensor. Such allows the in situ use of focus and zooming changes of light source for imaging object at different depth.

DETAILED DESCRIPTION OF THE INVENTION

Figure 1:
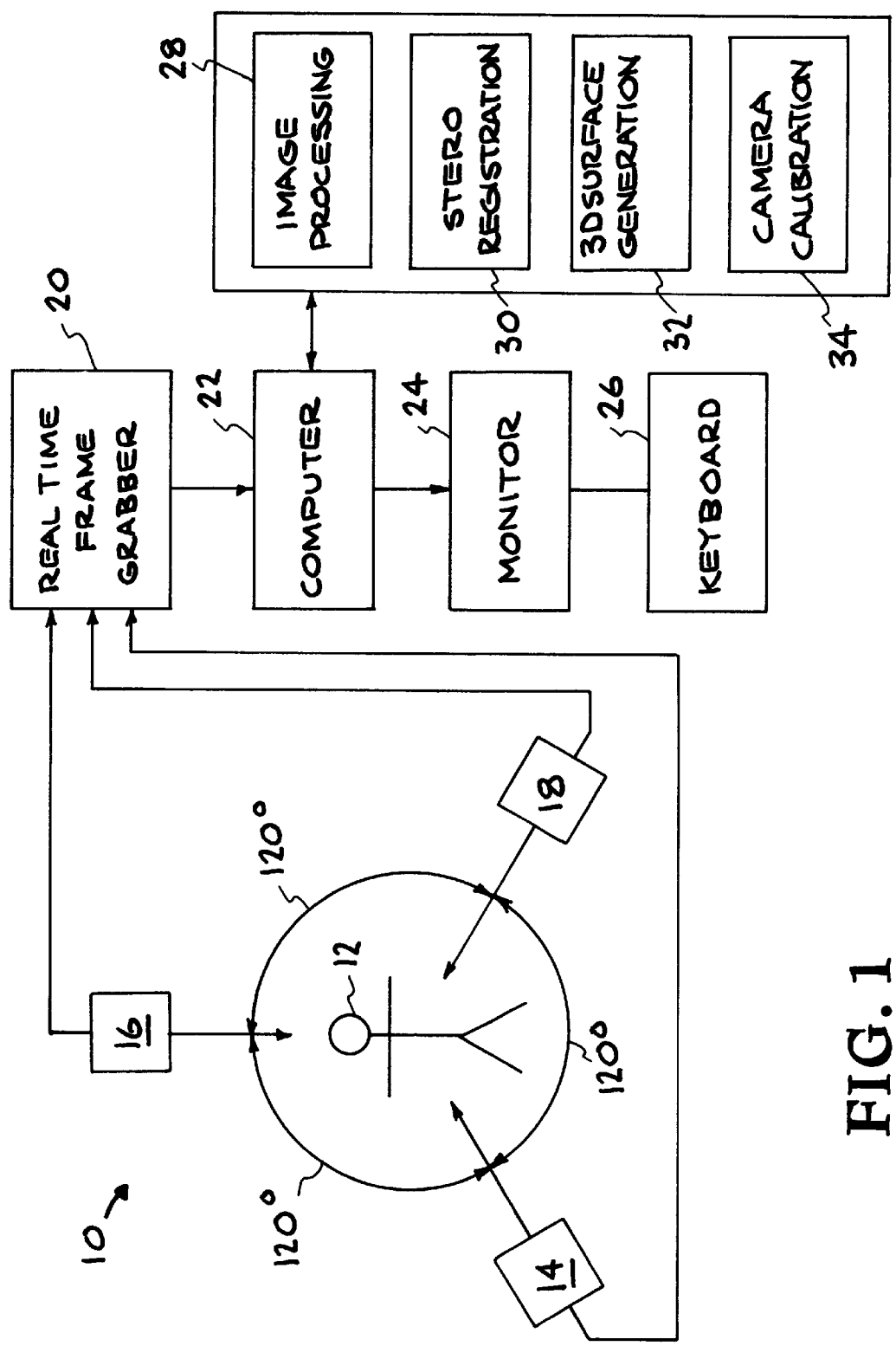
FIG. 1 is a functional block diagram of a three-dimensional motion camera system embodiment of the present invention.

FIG. 1 illustrates a three-dimensional motion camera system embodiment of the present invention, referred to herein by the general reference numeral 10. The system 10 is useful for imaging the surfaces of an object-of-interest 12, e.g., a human body in motion. The system 10 comprises a set of three stereo-imaging units 14, 16 and 18, a synchronous real-time frame grabber 20, and a computer system 22. a video monitor 24 and a keyboard 26. The computer code is divided into the following units, an image processing unit 28, a stereo registration unit 30, a three-dimensional surface generation unit 32, and a calibration unit 34. More or less than three stereo imaging units may be used in particular applications.

Figure 2:
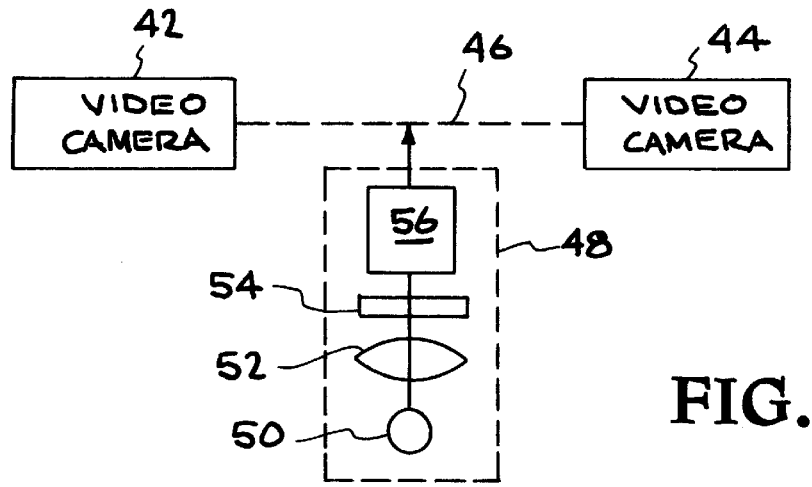
FIG. 2 is a functional block diagram of a stereo-imaging unit similar to the three imaging heads included in the system of FIG. 1.

FIG. 2 illustrates a stereo-imaging unit 40, similar to stereo-imaging units 14, 16 and 18. Two black/white cameras are used. A left video camera 42 is separated from a right video camera 44 along a baseline 46. A projection system 48 is placed between the cameras 42 and 44. An assembly 48 consists of a projector lamp 50, lens 52, glass plate of grating pattern 54, and a zoom lens 56. Assembly 48 sends light through a grating 54 on to a target to produce a set of light lines. The grating 54 can comprise a Ronchi ruling of fine parallel lines. The grating plate is positioned such that direction of these parallel lines is perpendicular to the camera base line.

Figure 3:
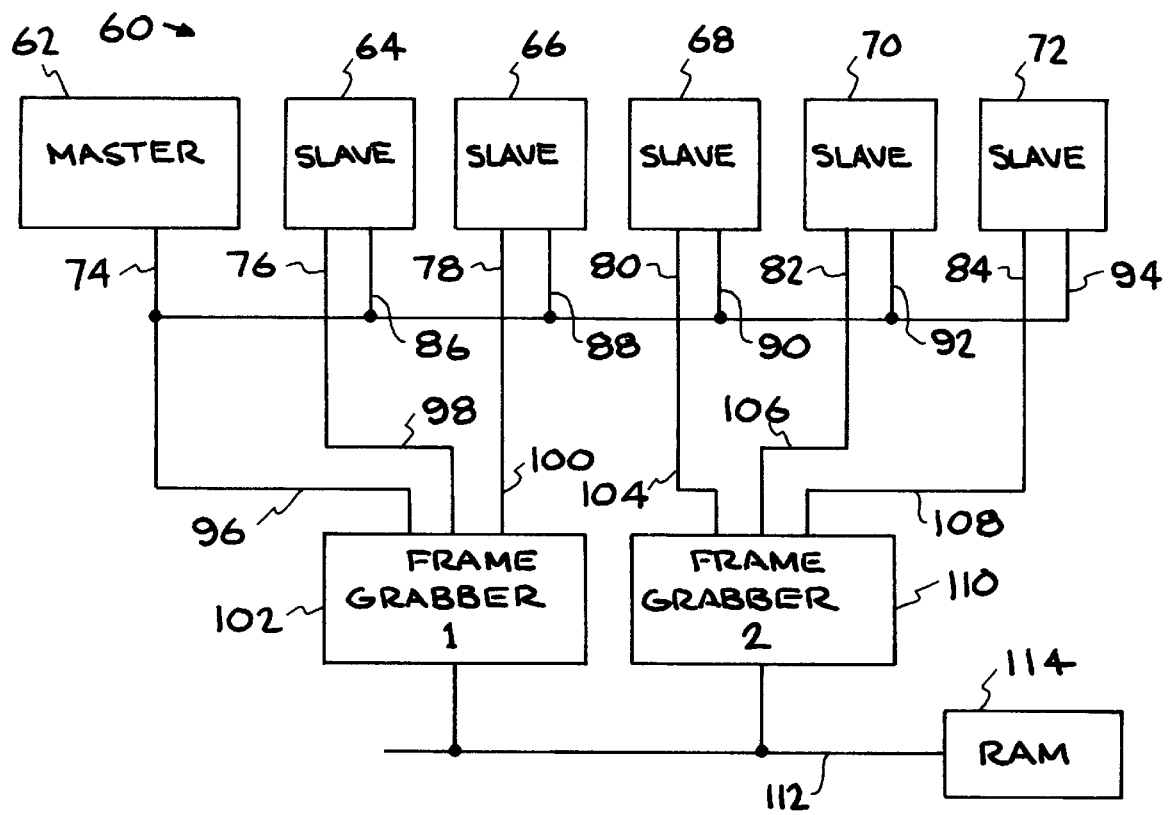
FIG. 3 is a connection diagram of the cameras and computer-frame grabber included in the system of FIG. 1.

FIG. 3 illustrates the synchronous real time frame grabbing unit 60. It is necessary that all six cameras 62, 64, 66, 68, 70, and 72 from the three imaging heads 14, 16, 18 are synchronized by "genlock" of the cameras, and daisy chaining them together. One of the cameras 62 is used as a master camera. The output video signal 74 from the master camera is spliced to provide the synchronous pulse for the auxiliary triggers 86, 88, 90, 92, 94 of the slave cameras 64, 66, 68, 70, 72. The six video output channels 74, 76, 78, 80, 82, 84, are connected to the three R/G/B input channels 96, 98, 100, of the color frame grabbing board 102 and the three R/G/B input channels 104, 106, 108, of the color frame grabbing board 110. Elements 96 to 110 are equivalent to the synchronous real-time frame grabber 20 in FIG. 1. The setup produces six digitized images simultaneously, and refresh at video rate of 30 Hz. The digitization resolution can be 480 by 640 pixels. Each pixel is represented as a single byte of integer corresponding to light intensity. Approximately 55 million bytes of data is captured, transmitted and stored for every second of imaging. The frame grabbing boards are connect to PCI bus 112 and images are temporarily stored in the RAM 114 of the processing computer 22 during capturing.

Figure 4:
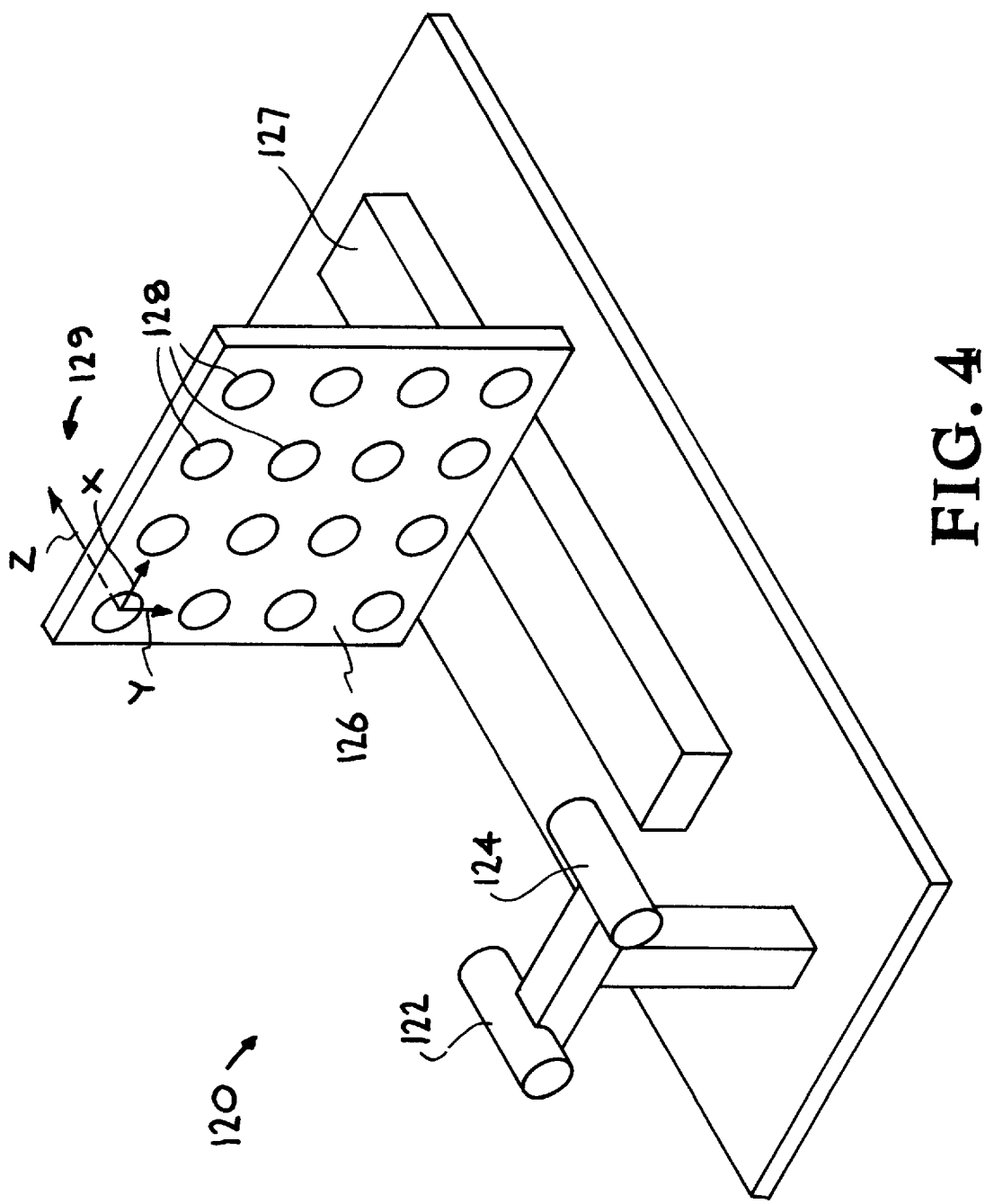
FIG. 4 is a perspective diagram showing a calibration setup for a stereo imaging head included in the system of FIG. 1.

FIG. 4 illustrates the calibration of a stereo imaging head unit 120. The stereo pair of cameras 122, 124 from an imaging head, similar to 42, and 44 in unit 40 is placed in front of a flat target plate 126 that is mounted on a motorized linear stage 127. An array of circular targets 128 with high contrast are printed on the plate at known equal distance. One of the target seen from the cameras is arbitrarily chosen as the origin of the coordinate system 129 specifically for this imaging head. Usually, the plane normal to the camera line of sight is defined to be the X-Y plane. All target points are associated with a three dimensional location in the coordinate system 129.

Figure 5:
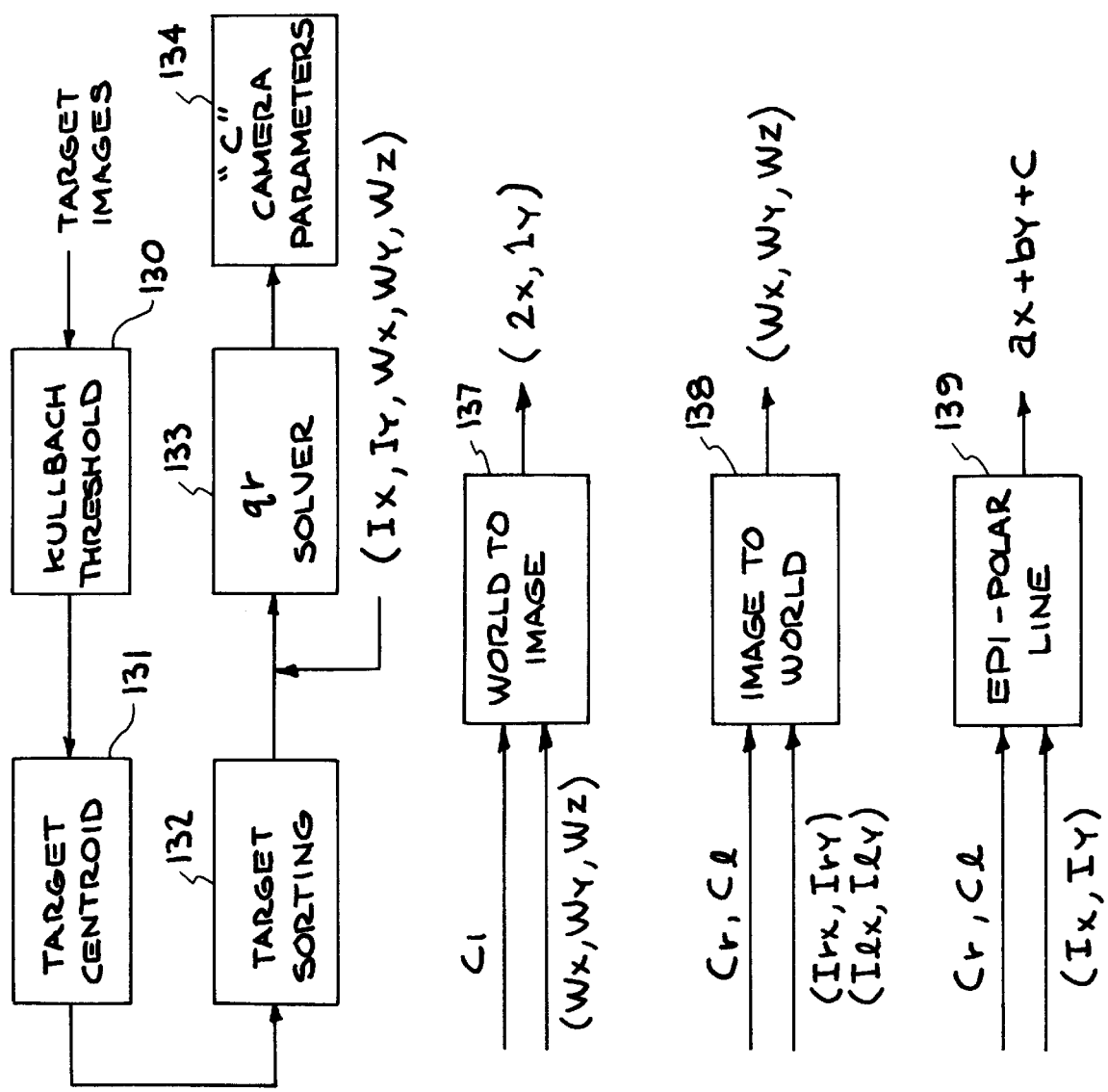
FIG. 5 is a set of four software flow diagrams showing how the calibration results are used in stereo calibration and utility programs.

FIG. 5 illustrates the computer software modules used in stereo calibrations. The camera calibration procedure consists of four subroutines, a Kullback threshold generation 130, a target centroid calculation 131, a target sorting 132, and a "qr" solver 133. Target images are taken from both cameras 122, 124. Each target image is processed by the Kullback threshold generator 130 and target centroid calculator 131 to generate central location of the targets. The target sorting 132 matches image target locations and the target locations in the coordinate system. Such process is repeated several times for different distance between the target plate and the cameras until the imaging area is properly covered. Each item in the collected data has the form of a seven tuple, (Ix, Iy, Wx, Wy, Wz), where (Ix, Iy) is the image location and (Wx, Wy, Wz) is the location of the target in space. Such data is used to solve for the camera model parameters "C" 134 that include parameters for the position and orientation of the cameras, the image center location, the focal length, the transformation matrix of converting virtual-world location to camera location, and lens distortion parameter of each camera. The format of a camera model is illustrated in Table 1. After the calibration, the camera are moved as a pair to the location where actual imaging is taking place.

TABLE 1

| Format of camera parameters obtained from calibration | |
|---|---|
| right camera: | camera position, (Prx. Pry, Prz) [mm] |
| | rotation angles, ($\phi r_1$, $\phi r_2$, $\phi r_3$)[deg] |
| | scaled focal lengths, (Frx, Fry) |
| | image center, (Crx, Cry) [pixels] |
| | distortion Dcoeffs (Dr1, Dr2, Dr3, Dr4, Dr5) |
| | distortion Ucoeffs, (Ur1, Ur2, Ur3, Ur4, Ur5) |
| left camera: | camera position, (Plx, Ply, Plz) [mm] |
| | rotation angles, ($\phi l_1$, $\phi l_2$, $\phi l_3$) [deg] |
| | scaled focal lengths, (Flx, Fly) |
| | image center, (Clx, Cly) [pixels] |
| | distortion Dcoeffs, (Dl1, Dl2, Dl3, Dl4, Dl5) |
| | distortion Ucoeffs, (Ul1, Ul2, Ul3, Ul4, Ul5) |

FIG. 5 also illustrates software modules 137, 138, 139 that use camera models to perform transformations between locations on image planes, and locations in space. The virtual-world-to-image module 137 takes one camera model C, similar to 134 from either camera such as 122 or 124, and a location in the virtual-world coordinate (Wx, Wy, Wz) and generate pixel location (Ix, Iy) on the image plane. The image-to-virtual-world module 138 takes both camera models Cr, Cl from the left and right cameras 122, 124, and pixel locations (Irx, Iry) and (Ilx, Ily) from both left and right image planes to a location in the virtual-world coordinate (Wx, Wy, Wz). The epipolar line module 139 take both camera model Cr, and Cl and a point (Ix, Iy) from one image plane, and generates coefficients (a, b, c) that represent a line on the other image plane. Such line is called "epipolar line" which will be explained in FIG. 9.

Figure 6:
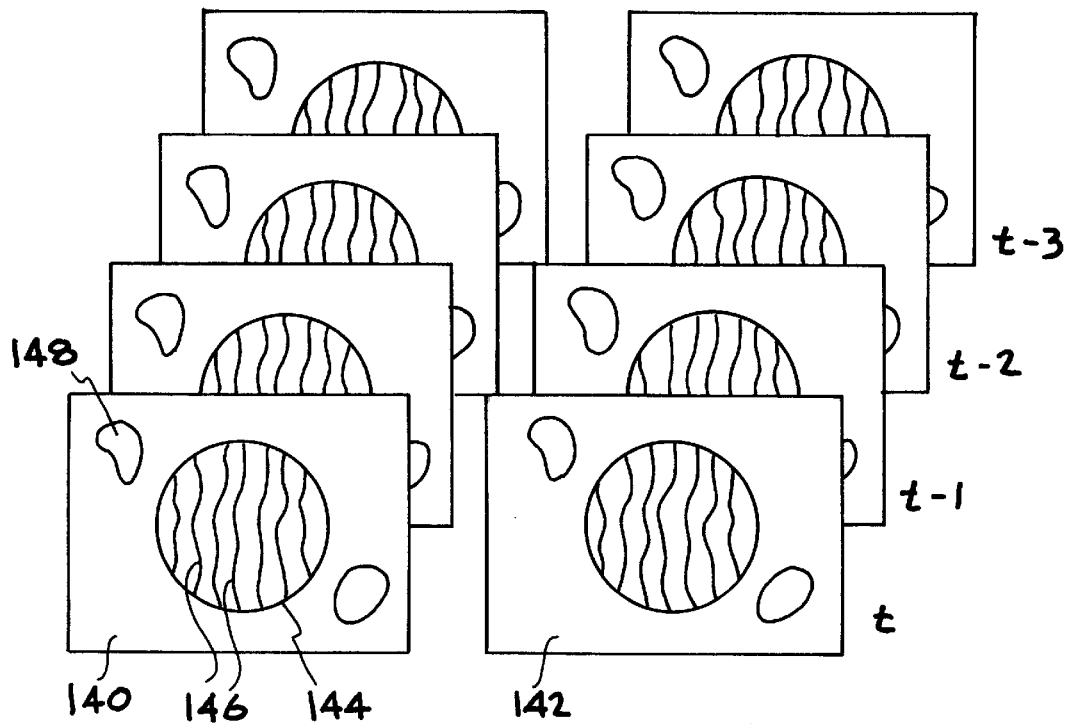
FIG. 6 is a diagram representing a time series of images obtained from left and right video cameras in the stereo-imaging unit of FIG. 2.
Figure 7:
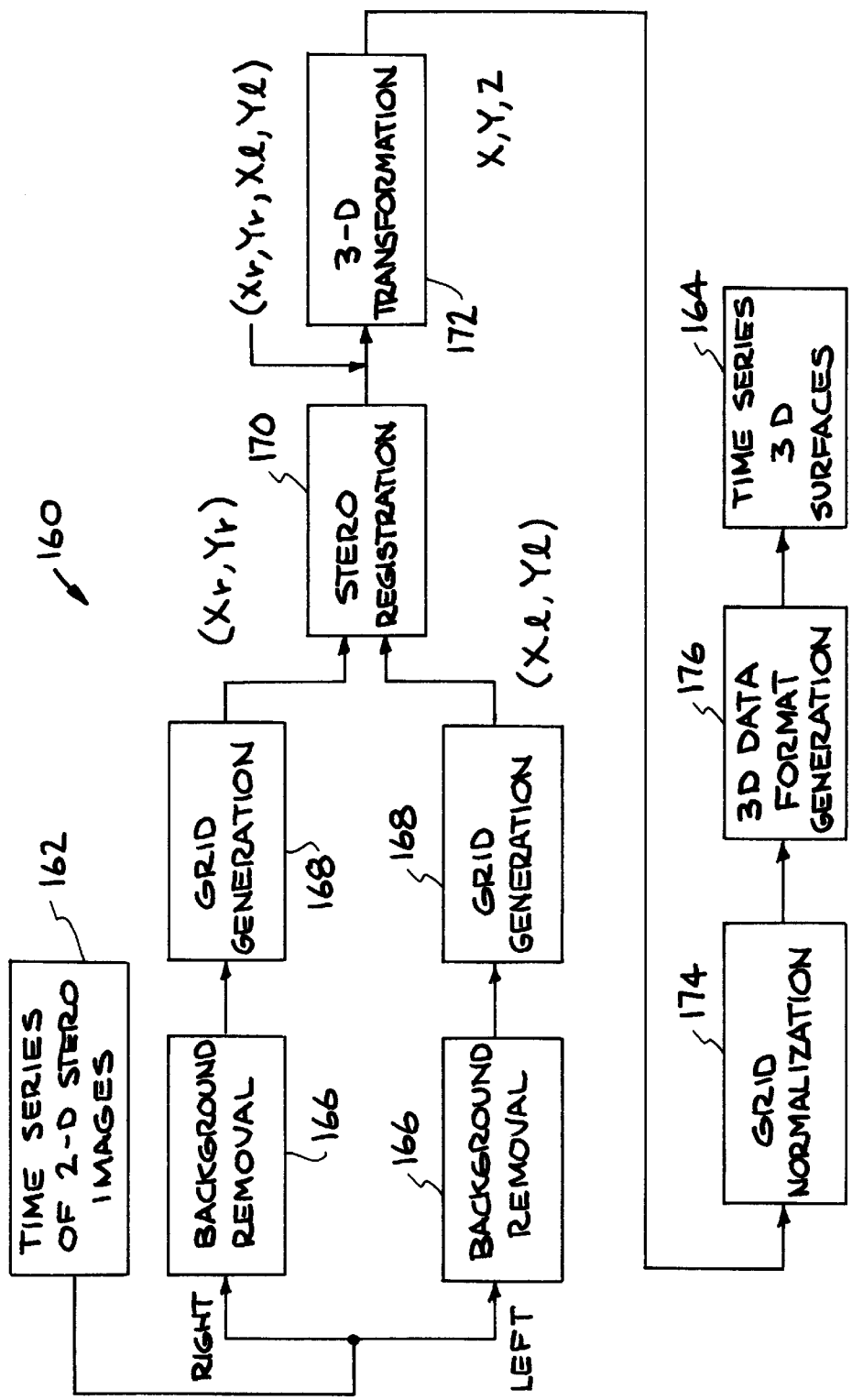
FIG. 7 is a flowchart of a three-dimensional surface process that receives the left and right video images from each pair of cameras of thestereo-imaging unit of FIG. 2.

FIG. 6 represents the time series of stereo images 140, 142 obtained from the right and left video cameras such as 42, 44, e.g., time series t-3, t-2, t-1, t, etc. An object 144 is seen near the center on the images with focused line strips 146. Background objects 148 are usually fall outside the depth of focus of the projector unit such as 48, and are seen without focused line strips. FIG. 7 illustrates the top level flow chart 160 of the computer code that converts the time series stereo images 162, similar to 140 and 142 into a time series three-dimensional surfaces 164 of an object, similar to 144. The computer code consists of the following steps, background removal 166, grid generation 168, stereo registration 170, three-dimensional transformation 172, grid normalization 174, and three-dimensional data format generation 176.

Figure 8:
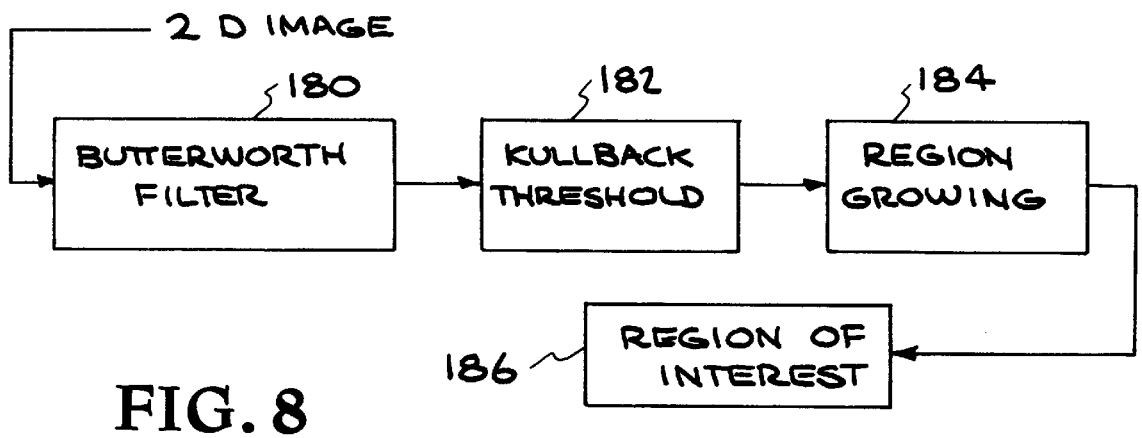
FIG. 8 is a flowchart for a background removal process.

FIG. 8. Illustrates a background removal process comprising two well-known algorithms, a Butterworth filter 180, and a Kullback threshold finder 182, and a region growing subroutine 184. The Butterworth filter is a band-pass filter that responds strongly to areas in the image where line strips are focused, such as 144. Background objects, such as 148 are weakened by this process. The Kullback algorithm automatically finds the threshold value that separates the area with high response from the area with low response. The region growing subroutine connects neighboring pixels that are above the threshold and count the pixels. Regions that contain small number of pixels are considered as background noise and discarded. The result is an delineated region of interest 186.

Figure 9:
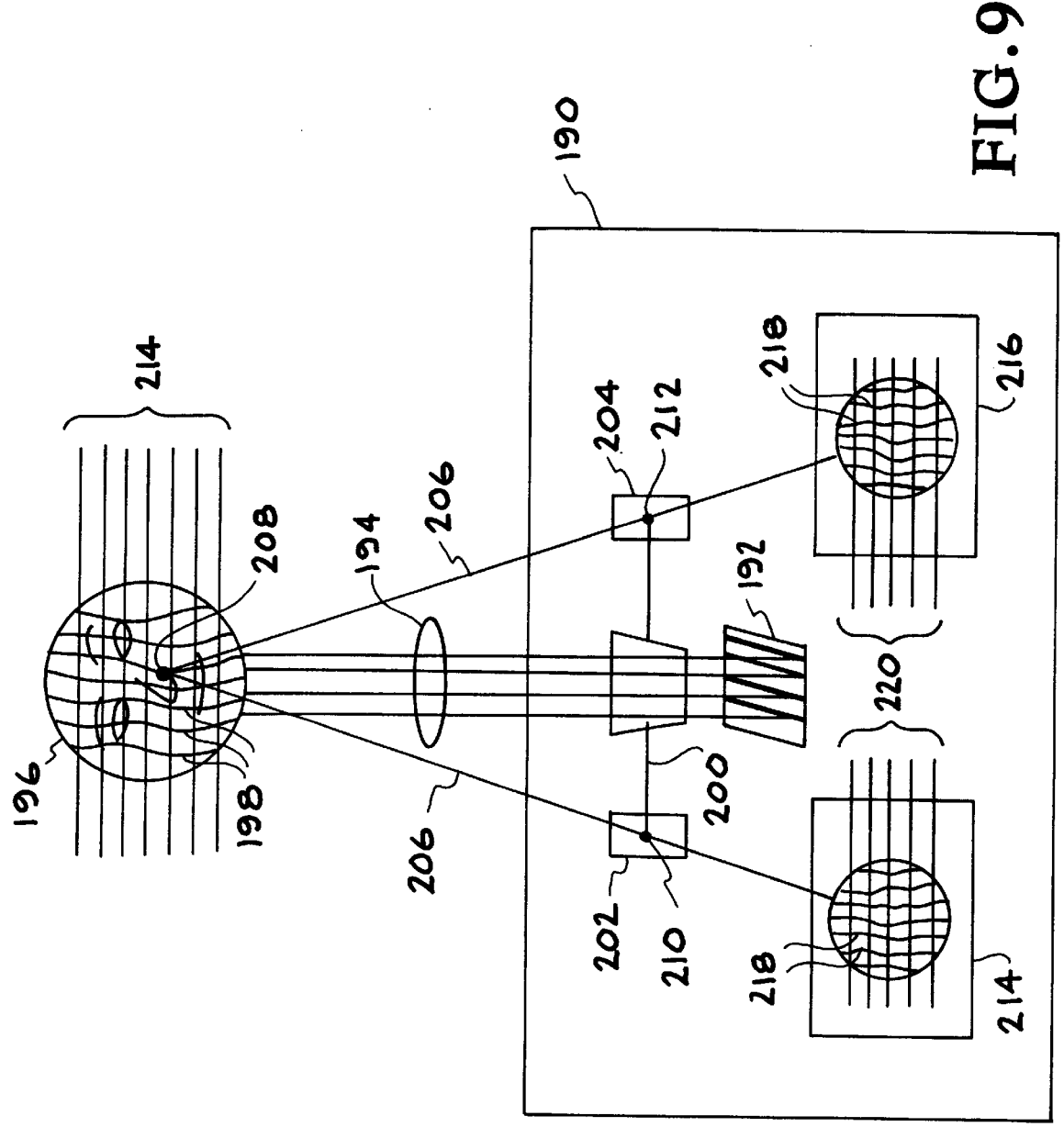
FIG. 9 is a diagram that illustrates the use of a vertical sheets of light and horizontal optical planes in a grid pattern that provide mathematical information using the camera calibrated in FIG. 4.

FIG. 9. illustrates the concept of grid generation, similar to 168. In this step a grid that comprises the edges of light sheet in vertical direction and epipolar lines along horizontal direction is generated. An imaging head unit 190, similar to unit 40 is used. Straight lines produced by Ronchi Ruling 192, similar to the grate pattern produced by light projector unit 48, creates parallel sheets of light 194 which are projected onto the object 196, similar to 12. The light plane intersects with the object 196 resulting wiggly lines 198 on the object. The base line 200 between the stereo cameras, 202, 204, and the two optical lines of sight 206 originated from a point in space 208 to the two focal points 210, 212 of the two cameras form an abstract epipolar plane 214 that intersect with the object 196 along the perpendicular direction of the projected lines 194. By defining a set of points on one image plane a group of parallel epipolar lines can be mathematically defined. The vertical sheets of light (visible) and the orthogonal epipolar lines (not visible) form a grid on the surface of the object. The image of the object is recorded on the image planes 214, 216 of the two cameras 202, 204. Object with focused line stripes 218 is seen on both images, similar to 144. The epipolar plane 214 defines a corresponding set of epipolar lines 220, one on each image.

Figure 10:
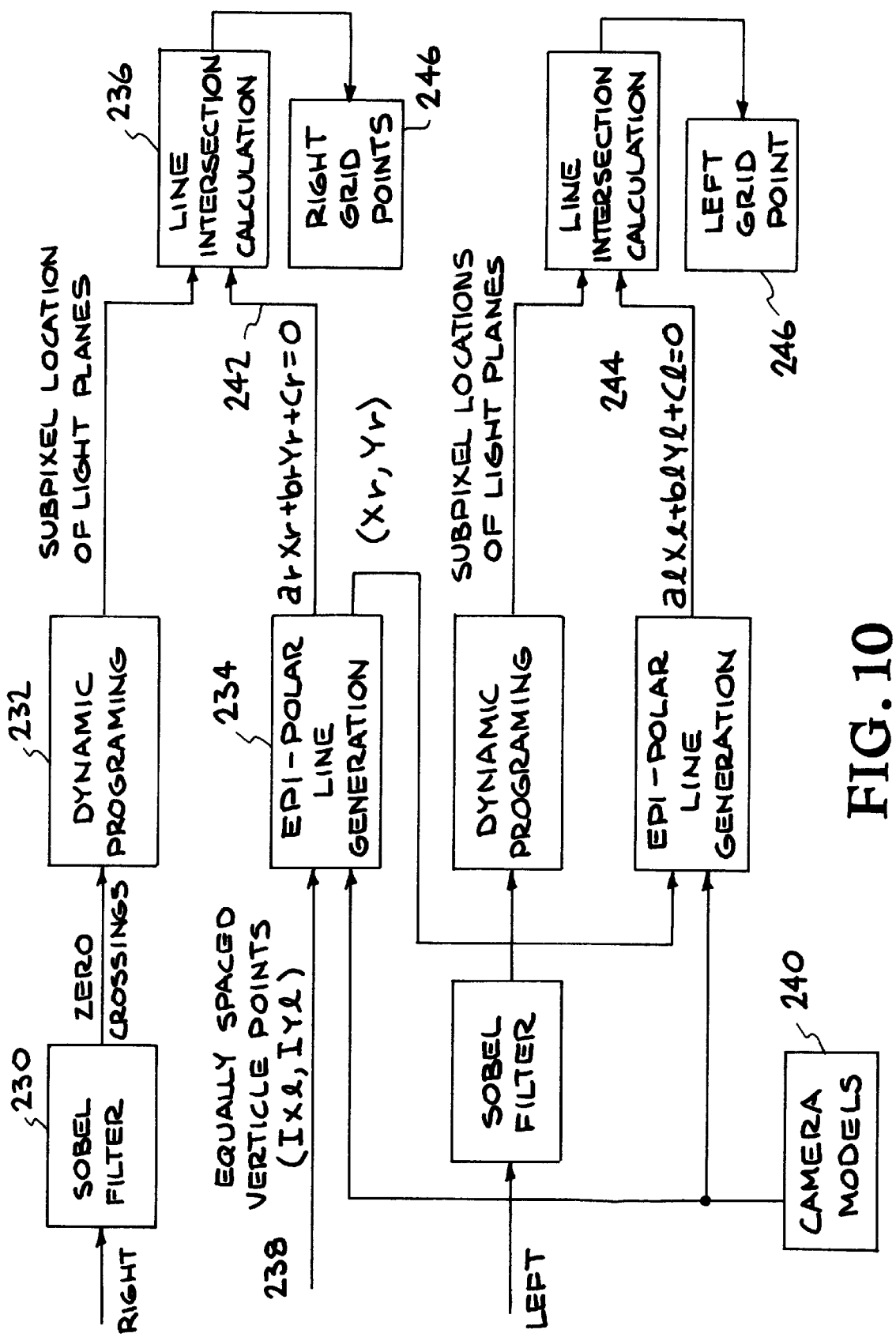
FIG. 10 is a flowchart of the software procedure for generating a grid from the apparatus shown in FIG. 9.

FIG. 10 illustrates a computer procedure of grid generation similar to 168. Such procedure consists of the following modules, Sobel filter 230, dynamic programming 232, epipolar line generation 234, and line intersection calculation 236. The profile of the line strips along a raster line of a camera has the shape that approximates a sinusoidal pattern, where peaks correspond to the brightness of the lines and troughs correspond to the darkness of the lines. The inflection point, where the second derivative of the profile changes sign, i.e. from positive to negative or vice versa, are extracted by using a Sobel filter. The computed inflection points (zero-crossings) are usually fall between the pixels, and yield as floating point numbers (subpixel). Since many parallel lines are projected, the association among all zero-crossings resulted from the same line strip needs to be established by using computer software. A dynamic programming technique that finds unique match between two sets of zero-crossings from two neighboring raster lines is used. The optimization criteria is to minimize the total offset between every two matching zero-crossings. Such process is applied to every two neighboring raster lines for the entire image. Zero-crossings that are chained together cross raster lines on an image define the edges of those sheets of light. The distance between neighboring light sheets defines the horizontal resolution of the final surface reconstruction. Such process is performed for both the left and the right images similar to 214, 216.

Equally spaced points 238 along a vertical line through the center of an image (assuming from the right image) are defined in the computer code. The spacing between two points defines the vertical resolution of the final surface reconstruction, which can be specified by the user. Each of these points defines an optical line of sight similar to 206 that can be "seen" as a line, similar to 218, on the other image. Such mathematically defined line is called the epipolar line. A point is arbitrarily chosen from the epipolar line. Such point defines the line of sight from the other camera that falls on the same epipolar plane. Such line of sight is used to calculate the matching epipolar line on the first camera. For each point, assuming from the left image, and the camera models 240, similar to 134, for the left and right cameras the epipolar line generation 234, similar to 139, generates coefficients for the corresponding epipolar line 242 on the right image. Such process is repeated for all these points 238. A point along 234, that is closest to the center of the image is computer selected and is used to generate the matching epipolar line 244 on the other image. The combination of epipolar lines and connected zero-crossings defines a grid on each image plane which are the image project of the grid made of parallel sheets of light, similar to 194 and epipolar planes , similar to 214. in space that intersects with the object The line intersection subroutine 236, calculate the subpixel locations of vertices on the grid.

Figure 11:
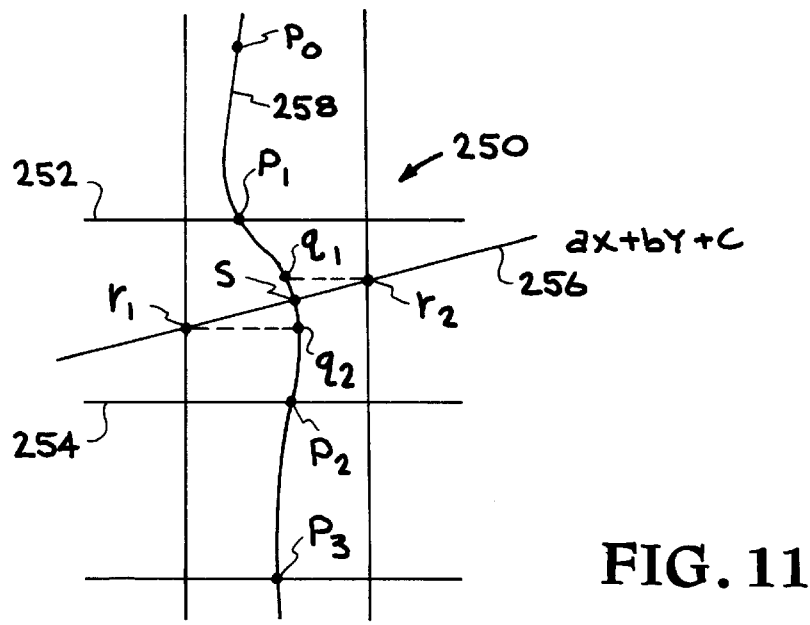
FIG. 11 is a diagram that helps illustrate the interpolation of subpixel locations of grid points from an image.
Figure 12:
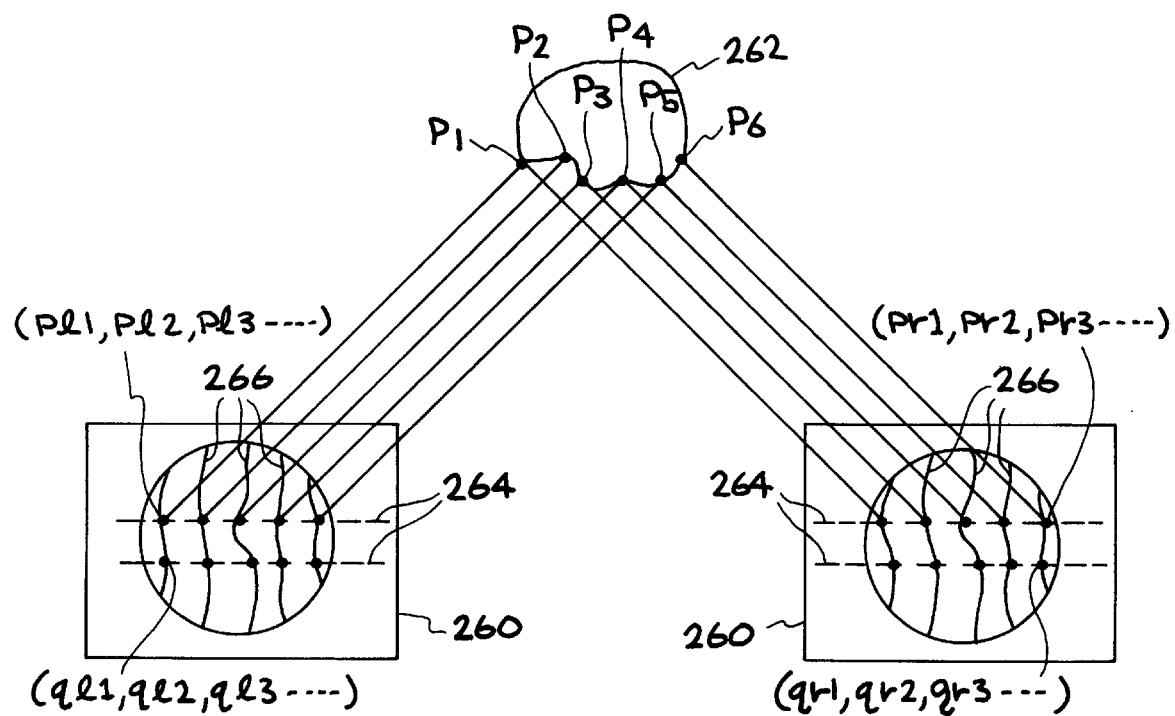
FIG. 12 is a diagram showing how the same object with a single set of parallel straight lines projected from the center will produce different left and right images of wiggled lines where the differences are accounted for by the stereo registration of a three-dimensional object.

FIG. 11 illustrates the calculation of line intersection, similar to 236. FIG. 11 show a zoom in pixel 250 between two image raster lines 252, 254 on an image. The pixel is on the intersection of a defined epipolar line 256 and a chain of zero-crossings 258. The zero-crossing locations p1, and p2 on 252, and 254, and p0 and p3 on the two adjacent raster lines, as well as the coefficients of 256 are obtained using subroutine 230, 232, and 234. They are the input to the line intersection subroutine 236. In this subroutine, the intersections of line 256 to the boundaries of the pixel 250 are calculated. They are labeled as r1, and r2 in the figure. The line strip, similar to 146 is approximated by a spline using p0, p1, p2, and p3. Locations q1 and q2 on the spline is calculated given r1 and r2. Finally the intersection point s is linearly interpolated using r1, r2 and q1, and q2. The result of grid generation is a set of grid points on each image. The correspondence of the grid points obtained from the left and right images needs to be established first before their three-dimensional locations can be calculated. Such step is called stereo registration, similar to 170. FIG. 12 illustrates the concept of stereo registration. Stereo images 260, similar to 214, 216 of an object 262, similar to 196 are shown with highlighted grid points from two epipolar lines 264 and three projected lines 266. Let P1 be a point on the surface of the object 262. Assume that Pr1 is the project of P1 on the right image and P11 is the projection of P1 on the left image, the purpose of stereo registration is to match Pr1 with P11 among all grid points. A mismatch of grid points will result in a wrong calculation of location in space.

Stereo registration comprises two steps, left-right matching along epipolar lines, and four-way consistency optimization. The left-right matching along epipolar lines uses dynamic programming to find unique match between two sets of grid points, (Pr1, Pr2, Pr3, . . . ) and (P11, P12, P13, . . . ) along every left-right pair of epipolar lines. The basic assumption here is that the projection of surface points on the same epipolar plane follows the left-to-right ordering relation. That is if P1 and P2 are two points on the surface, P1 and P2 on the same epipolar plane, and P1 is to the left of P2, then the projection of P1 and P2 follows the same left and right relationship on both of the stereo image. Dynamic programming is used to preserve the left-right ordering relationship when matching the two sets of grid points, in the mean time, to allow skipping grid points from either image in the match. The flexibility skipping of grid points during match is to accommodate vanishing line strip from one image due to occlusion. For example, as illustrated in FIG. 12. Pr1 and P11 are projections of P1, However, P12 is a project of P2 on the left image, but Pr2 is a project of P3 on the right image since P2 is occluded from the view of the right camera. The optimization criteria used here is the weighted sum of (1) the difference between the image intensity level, and (2) the difference of three-dimensional locations along the y-axis between two neighboring potential match. Such match is done independently for all corresponding epipolar lines. Table 2 is a program for stereo matching of pairs of epipolar lines.

TABLE II

Program for stereo matching pairs of epipolar lines

Input, intensity profiles of the $k^{th}$ pair of epipolar lines $I^{lk}$, and $I^{rk}$, and zero-crossings $(i_1, i_2,..., i_N)^{lk}$ and $(a_1, a_2, ..., a_P)^{rk}$.
Output, match[K][N], matching zero-crossings from the right image along $k^{th}$ epipolar line, with respect to the n left zero-crossings.
Constraints:
    a. left-right ordering.
        b. every zero-crossing can find at most one match.
Data Structure:
    a. signal, Il[N], Ir[P]
    b. array, cost[N][P], path[N][P]
    c. signal Ili contains the segment of intensity values between zero-crossings n and n+1.
        signal Irp contains the segment of intensity values between zero-crossings p and p+1.
Procedure
    (1) cost[0][0] = 0;
    (2) for n, from 0 to N
    cost[n+1][0] = delete(Iln)
    (3) for p, from 0 to P
    cost[0][p+1] = delete(Irp)
    (4) for n, from 0 to N
    (5) for p, from o to P
    (6) cost[n+1][p+1] = minimum of (7), (8), and (9):
    (7) cost[n][p+1] + delete(Ili),
    (8) cost[n+1][p] + delete(Irp),
    (9) cost[n][p] + match((Iln, Irp).
        (10) path[n+1][p+1] = 7, 8, or 9, if minimum is from (7), (8), or (9).
        (11) end of (5)
    (12) end of (4)
    (13) n = N, p = P
    (14) while(n > 0 && p > 0)
    (15) if path[n][p] = 7, n = n−1,
    (16) if path[n][p] = 8, p = p−1,
    (17) if path[n][p] = 9, n=n−1, p=p−1.
        zero-crossings $n^l$ and $p^r$ for a matching stereo pair.
        (18) end (14)
    (19) delete(Ix) = (number of pixels in segment Ix) * $\omega_1$.
        (20) match(Iln, Irp) = intensity difference between segment Iln and Irp.

Up to this point, a three way match is established, (Pr1)i and (Qr1)i+1 are two grid points on epipolar lines i and i+1 on the right image that are considered on the same light plane; similarly, (P11)i and (Q11)i+1 are on the left image that are considered to be on one light plane; and (Pr1)i and (P11)i are considered the stereo matching pair. The first two sets of match are determine by the grid generation module, similar to 168, the third set of match is generated by Table II. Such three-way optimal intensity-profile to intensity-profile connection are made independently throughout the stereo image. The result of matching of $(Qr1)i+1$ with a grid point on the left grid line epipolar line $i+1$ using Table II may or may not consistent with the established three way match. A four way consistency optimization procedure is used to check the consistency of all the matches, and to generate a global optimized match.

The program in Table III adjusts the match between zero-crossings in the left image and in the right image by adding distance criterion to the intensity criterion in the dynamic programming. If P11 is on the $L_f$ projected line in the left image, then the program finds all the zero-crossings on $L_f$ in the left image as well as all the zero-crossings in the right image that form the matching pairs. But due to the possibility of inconsistency, these zero-crossings in the right image may not coincide in same projected line. The program in Table III takes a majority vote, and assigns a projected line. The distance between zero-crossing Pr1 and the projected line in the right image is added to the optimization criteria, and a dynamic programming procedure such as Table II is performed again with the added optimization criteria.

The program in Table IV further optimizes the consistency between matches between time frame t-1 to the next frame at time t. Tracking between zero-crossings $((ii, i_2, \ldots, i_N)^{t-1}$ and $((i'_1, i'_2, \ldots, i'_{N'})^{f_k})^t$ in the left image is done by using a dynamic programming method where the distance between connected zero-crossings is minimized. The right image is treated similarly, by tracking the zero-crossings $((a_1, a_2, \ldots, a'p')^{r_k})^{t-1}$ and $((a'_1, a'_2, \ldots, a'p')^{r_k})^t$. An inconsistency occurs if any zero-crossings $((i_N)^{f_k})^{t-1}$ and $((i'_{N'})^{f_k})^t$ that are along the same projected line in the $r_k^{a_k}$ left images, $((ap)^{r_k t-1})$ and $((a'p')^{r_k t})$ are also along the same projected line in the right images, and where $((i_N)^{f_k})^{t-1}$ in the left image matches with $((ap)^{r_k})^{t-1}$ in the right image, but $((i'_{N'})^{f_k})^t$ in the left image does not match with $((a'p')^{r_k})^t$ in the right image. The distance between $((i_N)^{f_k})^{t-1}$ and $((i'_{N'})^{f_k})^t$ in the left image and the distance between $((ap)^{r_k})^{t-1}$ and $((a'p')^{r_k})^t$ in the right image is added to the dynamic programming of matching $((i'_1, i'_2, \ldots, i'_{N'})^{f_k})^t$ on the left and $((a'_1, a'_2, \ldots, a'p')^{r_k})^t$ in the right images to maximize the consistency.

TABLE III

Program for improved stereo match with consistent projected lines.
Input,
    a. left and right intensity images,
    b. all stereo matched pairs, match[K][N],
    c. all projected lines from left and right images, lineL[F][K], and lineR[F][K].
Output, improved matching, match[K][N].
Procedure
    (1) the same as step (1) to (18) in Table I, except the calculation of match(Iln,Irp).
    (2) lLf = the projected line that zero-crossing $(i_N)^{lk}$ is assigned to by Table II.
    (3) extract all zero-crossings on ILf from lineL[lLF][K], and from their matching zero-crossings in the right image from array match[.][.] generated from Table I.
    (4) find the projected lines in the right image the zero-crossings from (3) are assigned to by using array lineR[.][.].
    (5) lRg. = the majority vote of the projected lines from (4).
    (6) match(Iln, Irp) = distance between Irp and lRg.

TABLE IV

Program for improved stereo match with consistent time sequence tracking.
  Input,
    a. intensity images It from time t−1 and t.
    b. all stereo matched pairs, match[K][N] at time t−1, and match'[K][N] at time t.
    c. all projected lines from left and right images, lineL[F][K], and lineR[F][K].
Output, improved match, match'[K][N] for time t.
Procedure:
    (1) connect zero-crossings $(i_1, i_2, \ldots, i_N)^{lk}$ and $(i'_1, i'_2, \ldots, i'_{N'})^{lk}$ along the same epipolar line from two consecutive time frames t−1 and t, in the left images using Table II.
    (2) repeat (1) for the right images, connect zero-crossings $(a_1, a_2, \ldots, a_P)^{rk}$ and $(a'_1, a'_2, \ldots, a'_P)^{ck}$ along the same epipolar line from two consecutive time frames t−1 and t, on the right images.
    (3) repeat Table I to generate improved epipolar match for the $k^{th}$ lines in time t, i.e. match zero-crossings $(i'_1, i'_2, \ldots, i'_{N'})^{lk}$ with $(a'_1, a'_2, \ldots, a'_P)^{ck}$ except using a different match routine.
    (4) match(Iln',Irp') = distance$(i_N, i'_{N'})$ + distance$(a_P, a'_P)$.

After the matches between all grid points are made between the left and right images, a set of quadruples (Ixr, Iyr, Ixl, Iyl) are generated, where (Ixr, Iyr) is a grid point on the right image, and (Ixl,Iyl) is the matching grid point on the left image. The corresponding three-dimensional location in the coordinate system defined by stereo calibration similar to 120 is calculated using the image-to-virtual-world transformation subroutine, similar to 138. Camera models, similar to 134 for the left and right camera are used in this calculation. Such three-dimensional transformation procedure is similar to 172. The result is a set of three-dimensional points that are grouped according the to epipolar lines from which they are generated, and ordered according to the ordering of epipolar lines in one direction, and left-right relation in the other direction.

Figure 13:
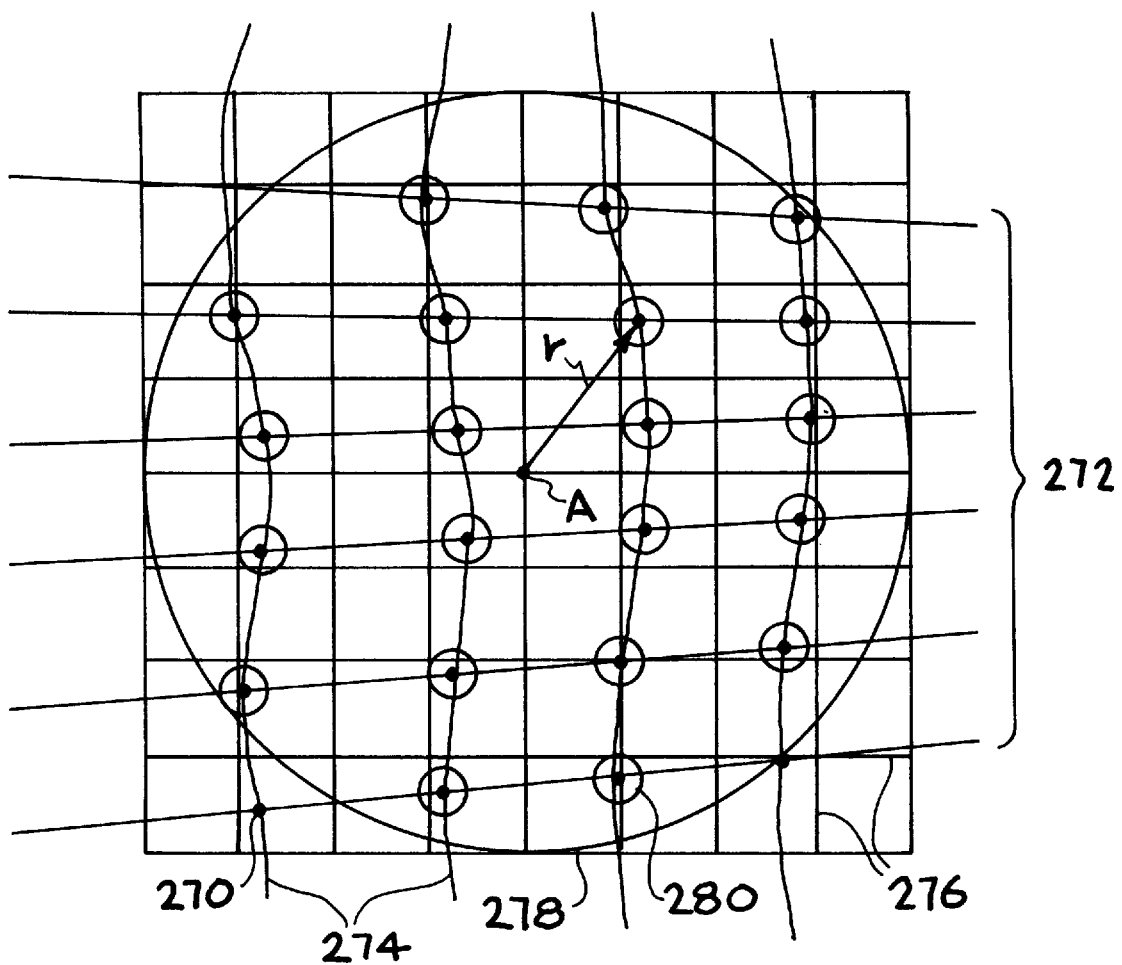
FIG. 13 is a close-up of one part of an image registered by a stereo camera that is forwarded to a grid normalization process.

FIG. 13 illustrates the concept of grid normalization, similar to 174. The three-dimensional points such as 270 are mapped onto the X-Y plane of the coordinate system, similar to 129. They form an irregular grid that correspond to the intersection of epipolar planes 272, similar to 214 and the edges of sheets of light 274, similar to 194. The value at each grid point is the Z-value (depth) of the three-dimensional point. The grid normalization subroutine transform the irregular grid to a regular grid 276 with resolution compatible to the irregular grid. The new Z-value of each point on the regular grid is calculated using a weighted sum of the Z-values of nearby three-dimensional points. Let A be a grid point, the circle 278 centered around A is a Gaussian window. three-dimensional points that fall within the Gaussian window are used to calculate the Z-value of A. These three-dimensional points 280 are shown in double circles in FIG. 13. The weight is calculated by $$r^2/e^{\sigma^2},$$

where r is the distance between A and the three-dimensional point, and σ controls the size of the Gaussian window.

Figure 14:
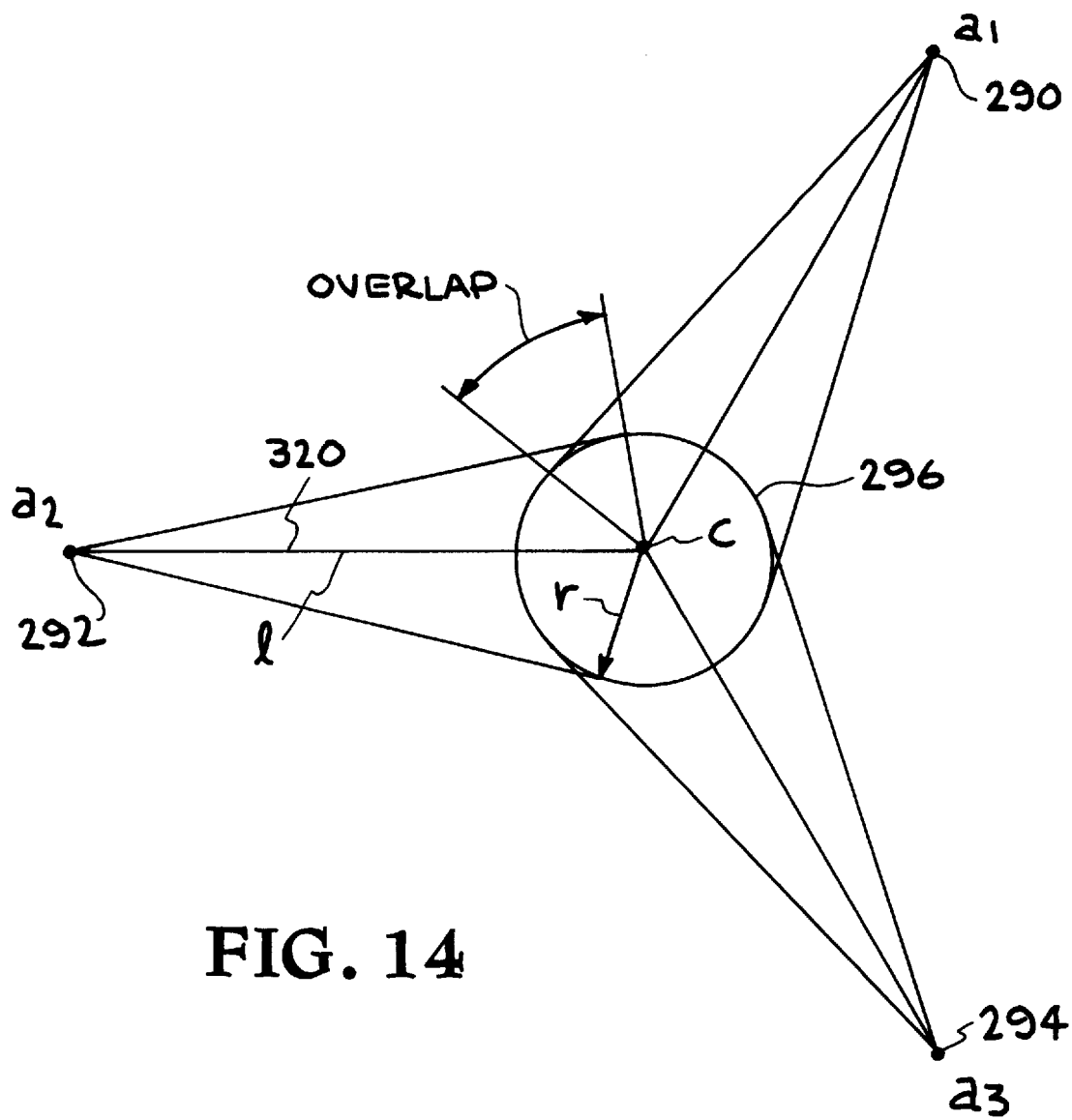
FIG. 14 is a diagram of the coverage and overlapping that can occur amongst three light projectors.

The final result of the camera system for one imaging head such as 14, can take several formats, three-dimensional points of irregular mesh, three-dimensional points of regular mesh, depth map, and surface normal map. The use of three imaging heads is the best compromise between light interference between projectors, and combined surface coverage of the stereo cameras. FIG. 14 illustrates coverage and overlaps of three light projectors. Light projectors 290, 292, 294, similar to 48 are arranged at 120° with respect to each other. A ball shaped object 296 is position at the center of this arrangement.

Assuming that the object of interest has radius r, the coverage of a single light projector is $$2 \times \cos^{-1}(r/l),$$

where l is the distance between the center of the object, C, and a light source. The overlapping angle between two neighboring light projectors is $$2 \times \cos^{-1}(r/l) - 2/3 \times \pi.$$

Figure 15:
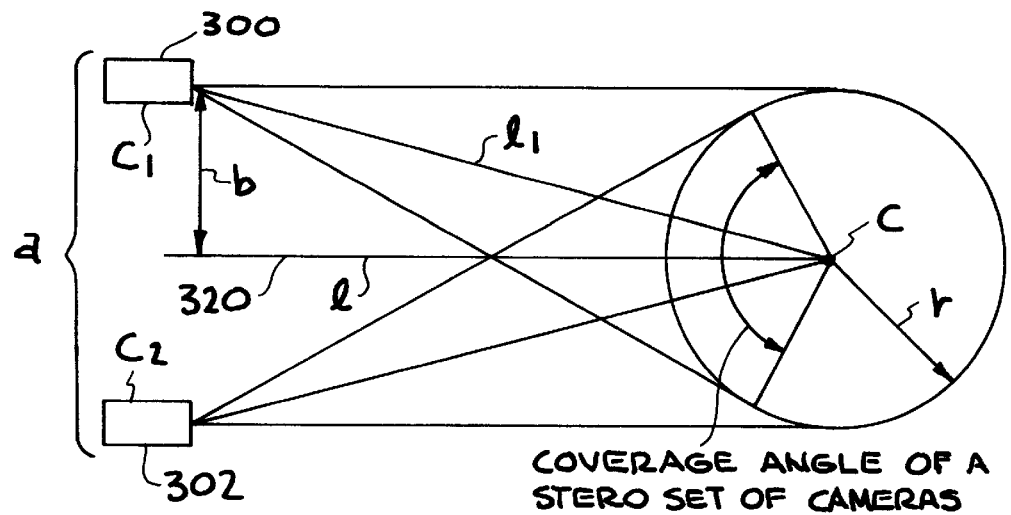
FIG. 15 is a diagram of the coverage and overlapping that can occur between two cameras in stereoscope.

FIG. 15 illustrates the coverage and overlaps of stereo cameras. The coverage of a set of stereo cameras 300 302, similar to those in unit 40 is the union of the coverage of individual cameras and can be expressed as, $$2 \times (\cos^{-1}(r/l_1) - \sin^{-1}(b/l_1)),$$

where, b is half of the stereo camera base line, and $l_1$ is the distance between the center of the object, C, and one of the stereo cameras, $C_1$, $$l_1 = \sqrt{l^2 \times b^2}.$$

The overlapping angle between two neighboring stereo camera sets is $$2 \times (\cos^{-1}(r/l_1) - \sin^{-1}(b/l_1)) - 2/3 \times \pi.$$

Figure 16:
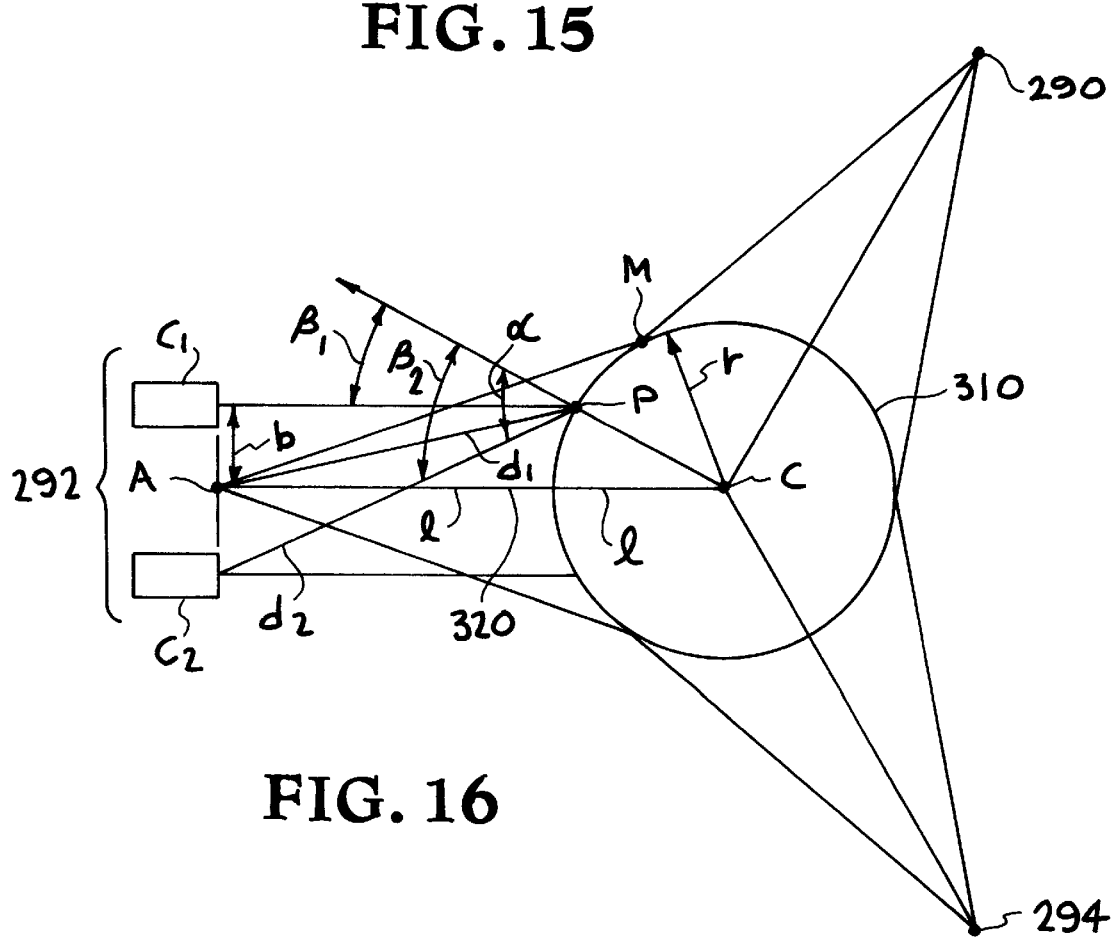
FIG. 16 represents a geometric model of the light interference of two neighboring imaging heads.
Figure 17:
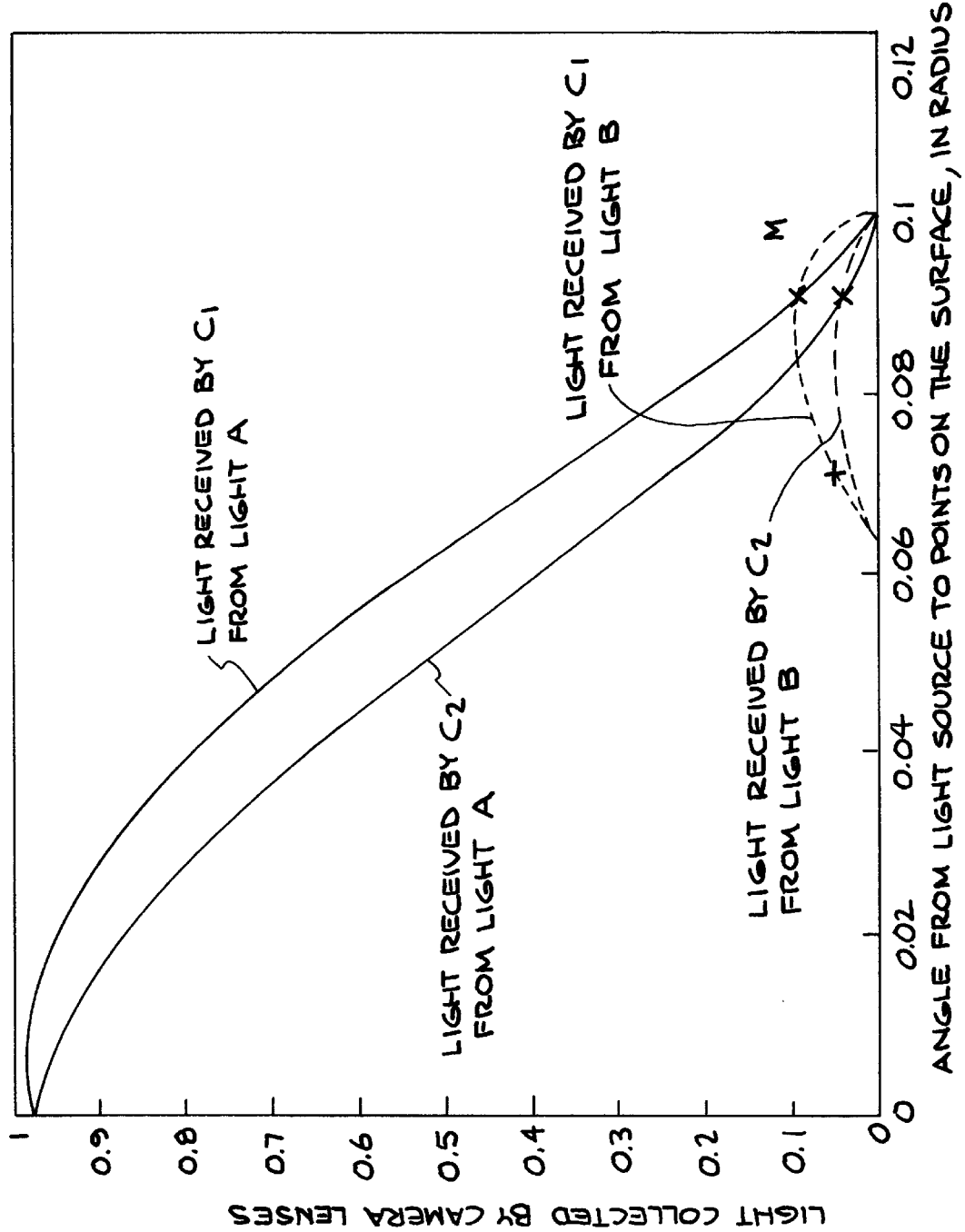
FIG. 17 is a graph showing the results of plotting the mathematical modeling of surface reflectance from two neighboring light sources seen by a single stereo camera set.
Figure 18:
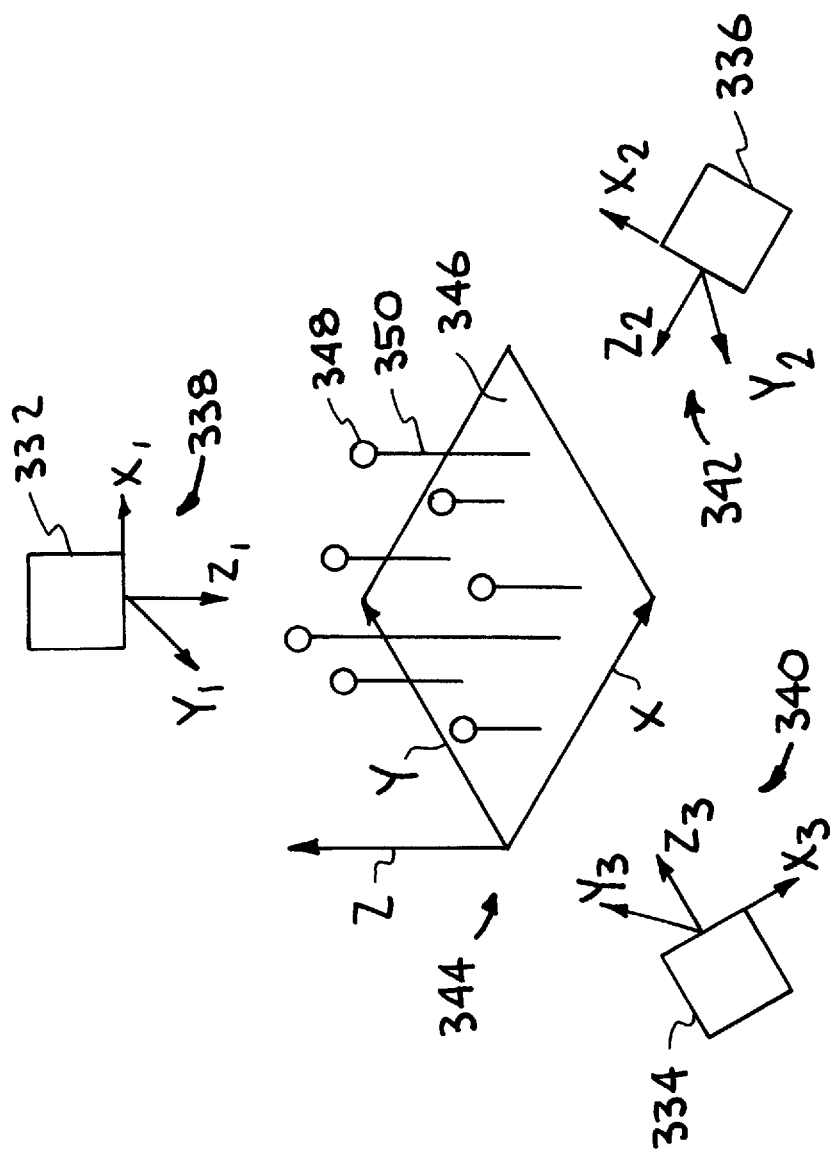
FIG. 18 is a diagram illustrating a multiple imaging head calibration setup.

FIG. 16 illustrates the modeling of light collected by the stereo cameras of one imaging head when the light of all three imaging heads are on. Assume that the object 310 has the shape of a ball, and has matted surface that defuse light in all directions evenly. The ball is place along the central axis of the light source, A. $C_1$ and $C_2$ are the stereo cameras of imaging head 1, Then the light collected in camera $C_1$ is in proportion to $$1/d^2 \times \cos\alpha \times 1/d_1^2 \times (\cos\beta_1)^2,$$

where d is the distance from A top, an p is a point on surface, α is the angle between A to p and the surface normal atp. Similarly, $d_1$ is the distance from $C_1$ to p, and $\alpha_1$ is the angle between $C_1$ to p and the surface normal at p. FIG. 17 is a plot that illustrate the light interference of two neighboring light sources as seen from one camera head. Such plot is generated by assuming the ratio b:1 is 1:10, and r:1 is also 1:10. The horizontal axis is θ in FIG. 16, i.e., the angle between the light source to p and the central axis 320. The vertical axis is normalized light collected by $C_1$ (the upper solid curve) and $C_2$(the lower solid curve). The circle sign 'o' at the right end of the top curve is the point where surface vanishing from both cameras. The dotted curves are the light generated from imaging head 2 and received by $C_1$ and C2 of imaging head 1. The sign '+' on the curve is the point on the surface that becoming visible from imaging head 2. The 'x' signs is the mid point, M, of the overlapping region of the two light sources. As shown in FIG. 17, although the light intensity from the two light sources have equal presence on the surface of the overlapping region, but the light source from imaging head 2 has much lower presence "seen" from cameras in imaging head 1. Therefore, the three imaging head arrange can provide 360° coverage without suffering from the problem of light interference. FIG. 18 illustrate the calibration among imaging heads. Each imaging head 332, 334, 336 establishes its own coordinate system 338, 340, 342 during stereo calibration illustrated in FIG. 4. Such step is to establish a mutual virtual-world coordinate system 344 for all imaging heads. The calibration apparatus 346 involves up to a dozen light colored balls 348 placed on dark colored poles 350 of different height. Such setup and all the imaging heads are place at the location where imaging is taking place, similar to unit 10. A world coordinate system 344 is defined, in which the location of the balls 348, and the height of the poles 350 are known. Each imaging head 332, 334, 336 then grab the images of the setup, and extract the locations of the balls as represented in its own imaging coordinate system 338, 340, 342. Such results in a data set where each item contains two three-dimensional locations for the same ball, the location based on the world coordinate system 344 and the location based on one of the imaging head coordinate system. A transformation matrix that translates from the imaging head coordinate system to the world coordinate system is calculated from this data using a matrix inversion program.

Figure 19:
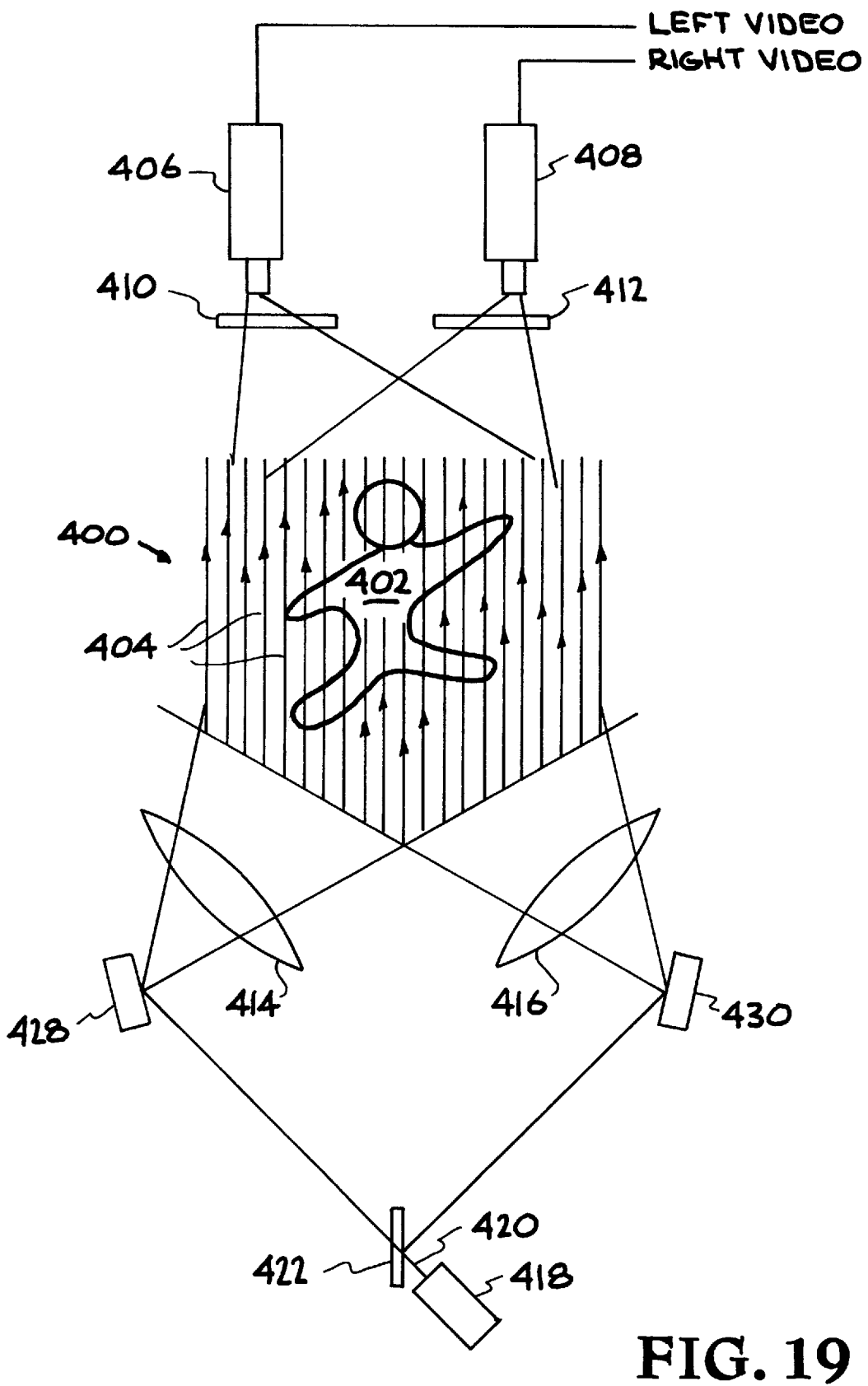
FIG. 19 illustrates a method and apparatus for generating extremely fine and closely spaced intensity planes of light by monochromatic laser light interference that are imaged by a stereoscopic pair of cameras that each have Moiré filters to highlight pattern variations that depart from a set of straight parallel lines.

FIG. 19 illustrates a method and apparatus of the present invention for generating extremely fine and closely spaced intensity planes of light by monochromatic laser light interference, and is referred to herein as a system 400. The object of the system is to detect and measure the three-dimensional positions occupied by the surfaces of an object-of-interest 402. A system of fine parallel lines of light 404 is directed fall on the object-of-interest 402 from a reference point. Such parallel lines of light 404 are imaged from perspectives different than the reference point by a stereoscopic pair of cameras 406 and 408. In alternative embodiments of the present invention a respective pair of Moiré filters 410 and 412 are used to produce pattern variation highlights that occur because the parallel lines of light 404 that fall on the surfaces of the object-of-interest 402 will not appear to be parallel nor straight due to the points of view of each camera from opposite sides of the central plane of light that intersects the object-of-interest.

A holographic laser apparatus is used to create a standing wave optical field that produces the fine parallel lines of light 404. Parallel planes of light are created that have maximum intensity when a pair of collimated beams 414 and 416 constructively interfere and that have minimum intensity when the beams 414 and 416 destructively interfere. A long-coherence length laser 418, e.g., a very low power type operating monochromatically in the infrared or far infrared, produces a beam 420. The cameras 406 and 408 must be matched to image such wavelengths of light. A beam splitter 422 divides the laser energy into a pair of beams 422 and 426. A pair of spatial filters 428 and 430 direct the resulting pair of beam fans 414 and 416 to cross. A volume of parallel planes of maximum intensity (beams add) and minimum intensity (beams subtract) intersect and illuminate the object-of-interest 402. When the laser 418 is turned off, the cameras 406 and 408 can be used to collect visual and thermal information related to the surface of the object-of-interest 402, e.g., to determine if the object-of-interest 402 is alive, moving, human, carrying anything, uniformed, etc. Such further information is then preferably data fused with the measurements of the three-dimensional positions occupied by the surfaces of the object-of-interest 402 in real-time in order to present a computer generated graphic model on a remote color monitor screen.

The 360° system shown in FIG. 1 can be implemented with the system of FIG. 19 by using different frequencies of monochromatic light for each of the imaging heads 14, 16, and 18, and by equipping the cameras with appropriate filters.

Figure 20:
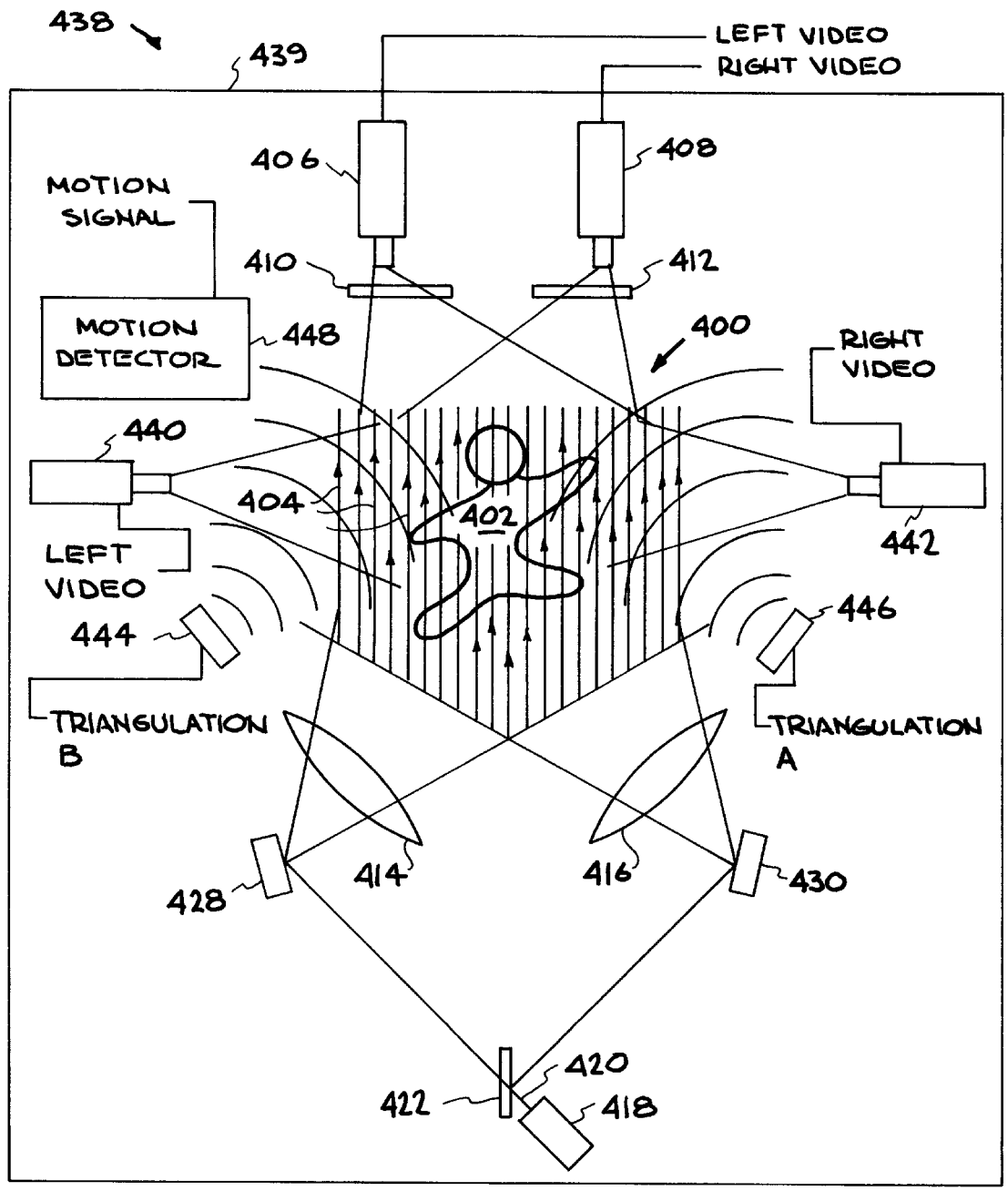
FIG. 20 illustrates a multi-sensor data fusion system for sensing real three-dimensional objects that enter a monitored chamber.

FIG. 20 illustrates a multi-sensor data fusion system 438 for sensing real three-dimensional objects that enter a monitored chamber 439. The system 400 of FIG. 19 is repeated here with the addition of a pair of visible-light video cameras 440 and 442, a pair of micro-impulse radars (MIR's) 444 and 446, and a motion detector 448. The MIR's 444 and 446 are used to provide raw data for a position triangulation computation in which the radar-determined distances between the object-of-interest 402 and each of the MIR's 444 and 446 are used to solve the X, Y position of the object-of-interest 402. This solution can then be used to initialize or bound the process 160 of FIG. 7 to reduce errors, improve computational efficiency, and detect motion that would interfere with the three-dimensional transformations.

Because the infrared lines of light that fall on the object-of-interest 402 will be so finely spaced apart, a high resolution of the relative Z-values may be obtained by equipping the cameras 406 and 408 with zoom lenses and panning mechanisms that may be automatically controlled by the process 160 in FIG. 7. The cameras may be zoomed in very tight, especially when extra measurement taking time is available and where subtle variations in the surfaces of theobject-of-interest 402 are important.

The additional sensors in system 438 versus system 400 provide more information about the visual appearance, the exact position in the monitored chamber, and annunciation of changes in position of the object of-interest 402. Such additional information is also data fused with the measurements of the three-dimensional positions occupied by the surfaces of the object-of-interest 402. Preferably such data fusion is done in real-time to present a computer generated graphic model, e.g., an avatar in a virtual reality world, on a remote color monitor screen. In particular, such presentation should be designed to help a human user viewing the presentation to make a rapid and accurate assessment of the true nature of the object-of-interest 402 through the use of color, rendering, texture, shape, and motion special effects techniques.

The micro-impulse radars (MIR's) 444 and 446 are preferably implemented according to the descriptions provided by Thomas McEwan, in his U.S. Pat. Nos., 5,521,600, Range-gated field disturbance sensor with range-sensitivity compensation; U.S. Pat. No. 5,630,216, issued May 13, 1997, Micropower RF Transponder with Superregenerative Receiver and RF Receiver with Sampling Mixer; U.S. Pat. No. 5,609,059, issued Mar. 11, 1997, for Electronic Multi-Purpose Material Level Sensor; 5,581,256, Range Gated Strip Proximity Sensor; application Ser. No. 08/379,044, filed Jan. 27, 1995, for Micropower Material Sensor; 5,519, 400, Phase-Coded, Micro-Power Impulse Radar Motion Sensor; application Ser. No. 08/486,081, filed Jun. 6, 1995, for Light Beam Range Finder; 5,576,627, Narrow Field Electromagnetic Sensor System and Method; 5,589,838, Short Range Radio Locator System; 5,563,605, Precision Digital Pulse Phase Generator; 5,517,198, Ultra-Wideband Directional Sampler; 5,465,094, Two Terminal Micropower Radar Sensor; 5,345,471, Ultra-Wideband Receiver; 5,523, 760, Ultra-Wideband Receiver; 5,457,394, Impulse Radar Stud Finder; 5,274,271, Ultra-Short Pulse Generator; application Ser. No. 08/451,876, filed May 26, 1995, for Short Range Micropower Impulse Radar with High Resolution Swept Range Gate with Damped Transmit and Receive Cavities; 5,510,800, Time-of-Flight Radio Location System; application Ser. No. 08/769,033, filed Dec. 17, 1996, for Short Range, Ultra-Wideband Radar with High Resolution Swept Range Gate; and, 5,479,120, High Speed Sampler and Demultiplexer. All such patents and patent applications of Thomas McEwan are incorporated herein by reference.

For the 360° imaging situation shown in FIG. 1, each of the outputs of the three stereo-imaging units 14, 16 and 18 is used to produce a corresponding three-dimensional mesh. Coordinates in these three-dimensional meshes are transformed to the world coordinate system, similar to 346. As a result, surfaces are merged together automatically. A surface polygon generator, implemented in computer software, is then preferably used to do a 360° surface rendering.

The system has applications to three-dimensional computer animation. Continuous three-dimensional surfaces of an actor that exhibit facial expression or movement, can be captured and reconstructed. The time sequence of three-dimensional surfaces can be used to immersed into other computer generated characters and environments for making movies, TV commercials and video games. Such system has been used in the production of a TV commercial.

The system can be used to measure movement of a human for orthopedic diagnostics, ergonomic evaluation and sports training.

The system can be used for manufacturing product design and rapid prototyping of human, such as prosthesis, gas mask, clothing, shoes accessories where conformity to body motion is the design goal. Such system has been used to generate time sequence of three-dimensional profiles of a mobile mannequin for the purpose of diaper design.

The system 10 has useful applications in medicine, sports, virtual reality, and entertainment. For example, it can be used to track the growth of infants and children or to witness the slow development of skin malignancy. In orthopedic and sports applications it can be used to make volumetric and movement measurements of the trunk and limbs for biomechanic and human motion analysis. Three-dimensional human models in motion can be generated for the evaluation of man-machine-environment interaction, e.g., for virtual prototyping and human factor study, as in the fitting of military head gear and face masks. Access control and security systems can benefit from being able to recognize faces in three-dimensions. And subject-specific computerized human models can be used for movie animation.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A system for detecting and measuring the three-dimensional positions occupied by the surfaces of an object-of-interest, comprising:

a first video camera and a second video camera separated from one another along a baseline and aimed in tandem at a target area and providing for respective first and second video images;

a light projector disposed between the first and second video cameras for projecting a first set of parallel light line segments at said target area; and three-dimensional surface generation means connected to receive said first and second video images and a camera pair calibration matrix and for translating the respective observations of said light lines distorted by their falling on an object-of-interest into a plurality of three-dimensional coordinates that estimate a surface of said object-of-interest and that conform to a plurality of measurements taken for said camera pair calibration matrix;

wherein, the three-dimensional surface generation means include frame grabbing means for synchronizing respective first and second video image outputs of the first and second video cameras and for storing a sequence of video frames in memory that represent image columns parallel to said first set of parallel line segments of light and image rows orthogonal to said first set of parallel line segments of light;

wherein; the three-dimensional surface generation means includes image warping means connected to the first and second video cameras for electronically warping the images from each camera to have a common plane of observation, wherein the horizontal and vertical linear scales of each image coincide with the other, and providing for an aligned image output for each of said first and second video images;

wherein, the three-dimensional surface generation means includes stereo image registration means for inputting said first and second video images line-by-line and taking separate second order derivatives of each to find a first and a second plurality of zero-crossings ($i_1$, $i_2$, . . . ,$i_n$)$^{left}$ and ($a_1$, $a_2$, . . . ,$a_p$)$^{right}$, wherein connections are plotted between corresponding zero-crossings of adjacent first video image lines, and connections are also plotted between corresponding zero-crossings of adjacent second video image lines, and wherein said first image zero-crossings are matched with said second image zero-crossings, line-by-line;

wherein, said plotting of corresponding zero-crossings of adjacent first image lines, said plotting of said corresponding zero-crossings of adjacent second image lines, and said matching of first and second images are all consistent with one another, and said matched pixel pairs are adjusted for consistency between epipolar lines, as indicated by said light lines, in both said first and second video images, and wherein said matched pixel pairs are also adjusted for consistency between successive image frames (t-3), (t-2), (t-1), (t), with said matches that are between zero-crossings being interpolated, and matched pairs being output at sub-pixel resolution.

2. A system for detecting and measuring the three-dimensional positions occupied by the surfaces of an object-of-interest, comprising:

a first video camera and a second video camera separated from one another along a baseline and aimed in tandem at an object-of-interest and that for respective first and second video images from different perspectives;

a holographic monochromatic infrared light projector disposed between the first and second video cameras for projecting a first set of parallel light line segments at said object-of-interest;

three-dimensional surface generation means connected to receive said first and second video images and a camera pair calibration matrix and for translating the respective observations of said light lines distorted by their falling on an object-of-interest into a plurality of three-dimensional coordinates that estimate a surface of said object-of-interest and that conform to a plurality of measurements taken for said camera pair calibration matrix;

frame grabbing means connected to the three-dimensional surface generation means for synchronizing respective first and second video image outputs of the first and second video cameras and for storing a sequence of video frames in memory that represent image columns parallel to said first set of parallel line segments of light and image rows orthogonal to said first set of parallel line segments of light;

image warping means connected to the first and second video cameras for electronically-warping the images from each camera to have a common plane of observation, wherein the horizontal and vertical linear scales of each image coincide with the other, and providing for an aligned image output for each of said first and second video images; and stereo image registration means connected to the three-dimensional surface generation means for inputting said first and second video images line-by-line and taking separate second order derivatives of each to find a first and a second plurality of zero-crossings ($i_1$, $i_2$, . . . ,$i_n$)$^{left}$ and ($a_1$, $a_2$, . . . ,$a_p$)$^{right}$, wherein connections are plotted between corresponding zero-crossings of adjacent first video image lines, and connections are also plotted between corresponding zero-crossings of adjacent second video image lines, and wherein said first image zero-crossings are matched with said second image zero-crossings, line-by-line, wherein said plotting of corresponding zero-crossings of adjacent first image lines, said plotting of said corresponding zero-crossings of adjacent second image lines, and said matching of first and second images are all consistent with one another, and said matched pixel pairs are adjusted for consistency between epipolar lines, as indicated by said light lines, in both said first and second video images, and wherein said matched pixel pairs are also adjusted for consistency between successive image frames (t-3), (t-2), (t-1), (t), with said matches that are between zero-crossings being interpolated, and matched pairs being output at sub-pixel resolution.

3. A three-dimensional motion camera system, comprising:

a plurality of stereo-imaging units for distribution around an object-of-interest, wherein each includes a first video camera and a second video camera separated from one another along a baseline and aimed in tandem at said object-of-interest wherein each video camera provides for respective first and second video images;

a laser light projector included in each of the stereo-imaging units and disposed between said first and second video cameras for projecting interfering collimated monochromatic beams of light to paint finely spaced parallel light lines on the surfaces of said object-of-interest;

three-dimensional surface generation means connected to receive each pair of said first and second video images and a respective camera pair calibration matrix and for translating the respective observations of said light lines distorted by their falling on an object-of-interest into a plurality of three-dimensional coordinates that estimate a surface of said object-of-interest and that conform to a plurality of measurements taken for said camera pair calibration matrix;

frame grabbing means connected to the three-dimensional surface generation means for synchronizing respective first and second video image outputs of said first and second video cameras and for storing a sequence of video frames in memory that represent image columns parallel to said first set of parallel line segments of light and image rows orthogonal to said first set of parallel line segments of light;

image warping means connected to said first and second video cameras for electronically-warping the images from each camera to have a common plane of observation, wherein the horizontal and vertical linear scales of each image coincide with the other, and providing for an aligned image output for each of said first and second video images; and stereo image registration means connected to the three-dimensional surface generation means for inputting said first and second video images line-by-line and taking separate second order derivatives of each to find a first and a second plurality of zero-crossings ($i_1, i_2, \ldots, i_n$)$^{left}$ and ($a_1, a_2, \ldots, a_p$)$^{right}$, wherein connections are plotted between corresponding zero-crossings of adjacent first video image lines, and connections are also plotted between corresponding zero-crossings of adjacent second video image lines, and wherein said first image zero-crossings are matched with said second image zero-crossings, line-by-line, wherein said plotting of corresponding zero-crossings of adjacent first image lines, said plotting of said corresponding zero-crossings of adjacent second image lines, and said matching of first and second images are all consistent with one another, and said matched pixel pairs are adjusted for consistency between epipolar lines, as indicated by said light lines, in both said first and second video images, and wherein said matched pixel pairs are also adjusted for consistency between successive image frames (t-3), (t-2), (t-1), (t), with said matches that are between zero-crossings being interpolated, and matched pairs being output at sub-pixel resolution.

* * * * *